United States Patent [19]

Andersen et al.

[11] Patent Number: 5,774,883
[45] Date of Patent: Jun. 30, 1998

[54] METHOD FOR SELECTING A SELLER'S MOST PROFITABLE FINANCING PROGRAM

[76] Inventors: Lloyd R. Andersen, 23 Ridgeline Dr., Newport Beach, Calif. 92660; Gregory P. Smith, 3941 E. South Bristol, #374, Santa Ana, Calif. 92704

[21] Appl. No.: 450,124

[22] Filed: May 25, 1995

[51] Int. Cl.$^6$ ..................................................... G06F 17/60
[52] U.S. Cl. .................................. 205/38; 705/35; 705/37
[58] Field of Search ..................................... 395/234, 235, 395/237, 238; 705/35, 37, 38

[56] References Cited

U.S. PATENT DOCUMENTS

| | | |
|---|---|---|
| 4,736,294 | 4/1988 | Gill et al. . |
| 4,742,457 | 5/1988 | Leon et al. . |
| 4,774,664 | 9/1988 | Campbell et al. . |
| 4,812,628 | 3/1989 | Boston et al. . |
| 4,876,648 | 10/1989 | Lloyd . |
| 4,914,587 | 4/1990 | Clouse . |
| 4,953,085 | 8/1990 | Atkins . |
| 5,180,309 | 1/1993 | Egnor . |

OTHER PUBLICATIONS

Tyson, David; "Interlinq Mortgage Software Hits Big:"; American Banker; Nov. 18, 1987; p. 12; v.152; No. 226.

Rusnak, Raymond; "Consumer Credit Scoring: . . . "; Journal of Commercial Lending; v76; n11; pp. 37–42; Jul., 1994.

Eisemann, Peter; "Sharp Dealer Practices Could Menace Bank Lenders"; Journal of Retail Banking, v15, n2, p. 21(3); Summer 1993.

Mortgageware™ Resource Guide; Release 5.4d Nov. 1992; Chapter Get; QUA; Pro.

Clarke, Jim, "Move Over ATM, automated loan officer is here," Associated Press, Times Advocate, Feb. 19, 1995.

Hutson, Michael, "Analyst: An Advisor for Financial Analysis of Automobile Dealerships," *Innovative Applications of Artificial Intelligence*, AAAI Press/The MIT Press, Mar. 1989.

Vu, Hao, "Potential Applications of Artificial Intelligence and Expert Systems in Financial and Banking Institutions," *Proceedings of the Second Annual Artificial Intelligence and Advanced Computer Technology Conference*, May 1986.

Arend, M., "New Automated 'Experts' Ready for Lenders," *ABA Bank. Journal*, Jan. 1992. (Abstract only).

Alvarez, M., The Development of an Expert System for Credit Control, Integrated with a Transactional Accounting System, *A.I.C.A. Annual Conference Proceedings*, Sep. 1990. (Abstract only).

Sivasankaran, T., An Expert System for Analysis of Credit Profiles, *Journal Comput. Inf. Syst.*, Summer 1990. (Abstract only).

Power, R., A System for Assessing Credit–Worthiness, *8th International Workshop Expert Systems and their Applications*, Jun. 1988. (Abstract only).

Hart, Peter E., "Syntel™: An Architecture for Financial Applications," *Innovative Applications of Artificial Intelligence*, AAAI Press/The MIT Press, Mar. 1989.

Kindle, Kyle W., et al., "PFPS: Personal Financial Planning System," *Innovative Applications of Artificial Intelligence*, AAAI Press/The MIT Press, Mar. 1989.

*Primary Examiner*—Robert A. Weinhardt
*Assistant Examiner*—William N. Hughet
*Attorney, Agent, or Firm*—Knobbe, Martens, Olson & Bear, LLP

[57] ABSTRACT

A transaction management system and method of validating the sale of an asset. The system may be used by a vehicle dealership to evaluate a customer's credit risk, budgetary factors, and profitability of the sale during negotiations for sale of a vehicle, thereby facilitating the sale from both the customer's and dealership's point of view by properly structuring the transaction. The system enables the dealer to pool front-end and back-end profit items to maximize profits. The system performs expert functions to funnel the customer's credit information into a best fit with one of a plurality of specific finance program tiers.

7 Claims, 23 Drawing Sheets

"FIRST PENCIL" EXAMPLE

| | | | |
|---|---|---|---|
| TYPE | NEW | 95 ACUR INTEGRA SDN | |
| SELLING PRICE | 20,000.00 | TERM (MONTHS) | 48 |
| ACCESSORIES | 0.00 | 1st PAYMT 03/11/95 | DAYS 45 |
| DOC FEE | 35.00 | LIFE PREMIUM | 586.97 |
| DEALER SMOG FEE | 0.00 | AH PREMIUM | 1,665.94 |
| TAX (8.25%) | 1,652.89 | UNEMP PREMIUM | 2,276.24 |
| LUXURY TAX | 0.00 | PHY DMG PREMIUM | 0.00 |
| SERVICE CONTRACT | 1,595.00 | TRADE ALLOWANCE | 0.00 |
| LICENSE FEE | 437.00 | TRADE PAYOFF | 0.00 |
| WEIGHT FEE | 0.00 | PICK-UP PAYMENTS | 0.00 |
| STATE SMOG FEE | 0.00 | CUSTOMER REBATE | 0.00 |
| OTD PRICE | 23,719.89 | DOWN PAYMENT | 5,960.00 |
| PAYMT (JL+AH+IU) | 687.27 | TOTAL DOWN | 5,960.00 |
| ADD-ON (12.00) | APR 20.27 | AMOUNT FINANCED | 22,289.04 |
| FIRST PENCIL | [80%adv] | g2485h0r0i1076s875t4436 | |

"FOUR SQUARE" EXAMPLE ⟵ 340

| | |
|---|---|
| SELLING PRICE............ 20,000.00<br>CASH/TRADE EQUITY...... 5,960.00<br><u>348</u> | TERM (MONTHS)............ 48<br>PAYMENT (JL+AH+IU).... 687.27<br>APR ........................ 20.27% |

FIG. 6

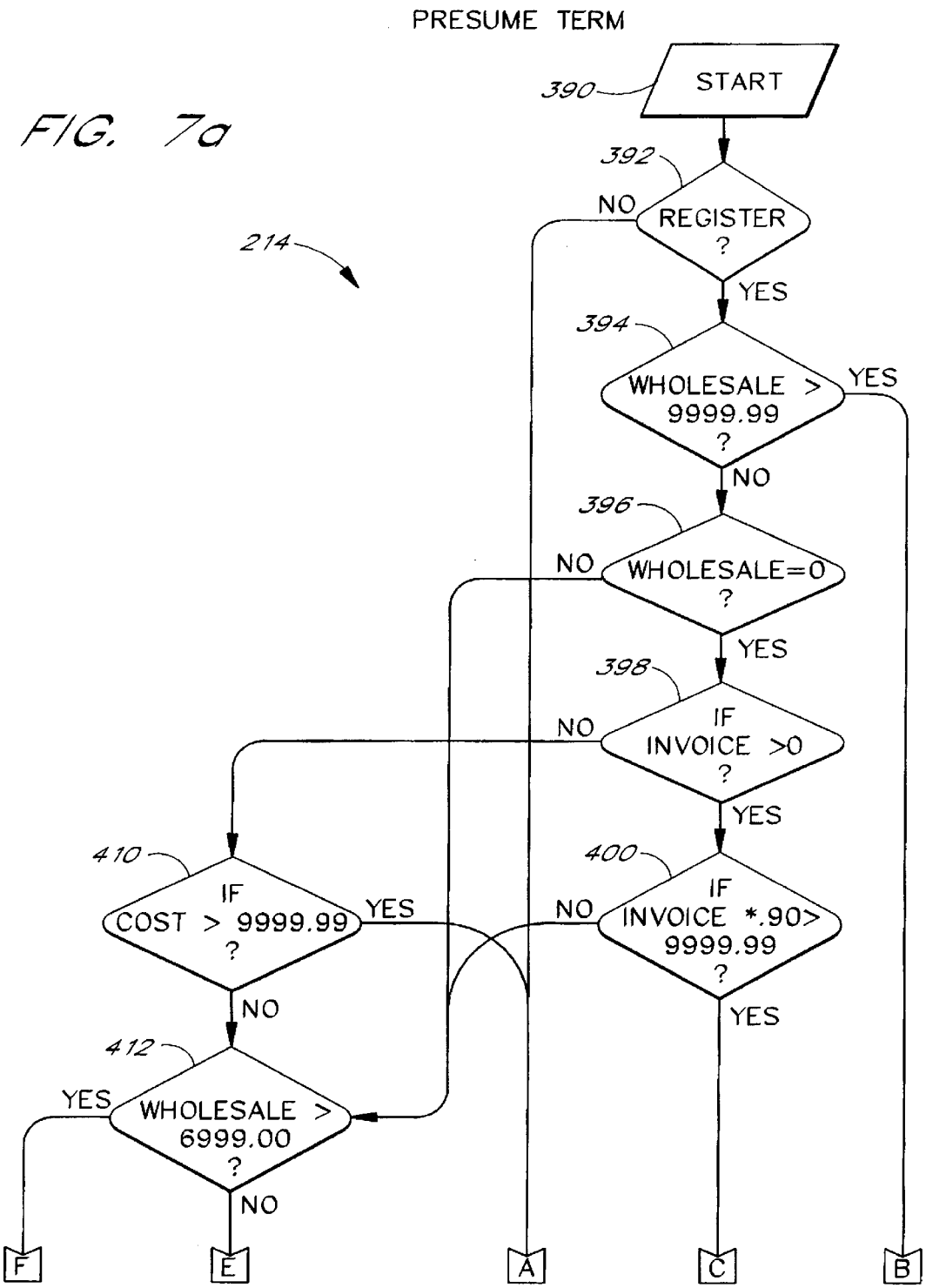

METHOD FOR SELECTING A SELLER'S MOST PROFITABLE FINANCING PROGRAM

MICROFICHE APPENDIX

A microfiche appendix containing computer source code is attached. The microfiche appendix comprises twenty three (23) sheets of microfiche having 1266 frames, including one title frame.

The microfiche appendix contains material which is subject to copyright protection. The copyright owner has no objection to the reproduction of such material, as it appears in the files of the Patent and Trademark Office, but otherwise reserves all copyright rights whatsoever.

BACKGROUND OF THE INVENTION

1. Field of the Invention

The present invention relates to transaction systems, and more particularly to a system and method for validating a sale of an asset.

2. Description of the Related Technology

The global economy has made the business of selling more competitive than ever. Businesses that do not maximize customer satisfaction and profitability will not survive in today's markets. Businesses are therefore demanding tools and methods to provide a competitive edge.

In many retail markets, advertising drives consumers to desire a product and purchase it as soon as possible. If anything stands in the way of immediate gratification, the customer may reconsider the purchase (delay or back-out), or may go to a competitor who can provide the product immediately. Thus businesses desire ways to streamline and quicken the sales process and increase customer satisfaction, while at the same time maximizing their profits.

Various types of transaction systems and programs have been created during the past decade. For instance, U.S. Pat. No. 4,346,442 to Musmanno describes a cash/brokerage management financial system which provides for automatic investment of free cash balances while, at the same time, integrating a margin brokerage account, a credit card account, a checking account and short term investment accounts. As another example, U.S. Pat. No. 4,774,664 to Campbell, et al., describes a financial data processing system having multiple terminals and a central processor which includes a data bank. Each terminal can write multiple loan payment data and loan application data into the data bank.

U.S. Pat. No. 4,742,457 to Leon, et al., describes a system for financial management for banks which adjusts deposit and loan accounts, along with respective rates, to the capital needs of an institution and related goals of a customer. Specifically, this investment management system adjusts the deposit and loan accounts for inflation.

U.S. Pat. No. 4,812,628 to Boston, et al., describes a transaction system with off-line risk assessment. The issuer of transaction cards in this system regulates the type of authorization requests transmitted from the point of transaction. The cards have risk assessment data, which is used to generate a pending transaction limit, associated with each cardholder. The amount of a transaction is compared to the pending transaction limit at a terminal used by the card holder.

U.S. Pat. No. 4,736,294 to Gill, et al., describes a system to administer and manage vehicle loan financing transactions wherein a vehicle dealership accepts a loan application from a customer and transmits it by computer to a bank branch for analysis. A residual value of the vehicle at a predetermined option date, typically, 36 or 48 months from the date of purchase, is determined at the time of making the loan. The system uses aspects of leasing and aspects of a program where the loan is secured by a chattel mortgage on the car (large balloon payment at end of term). Using the Gill system, the customer makes low monthly payments, takes title to the vehicle, and the customer is ensured he can sell the car at a predetermined price at the end of the loan term. Adjustment is made of the residual value to account for excessive mileage driven, and then the original loan is either closed out or refinanced at the end of the term.

None of these prior systems address the problem of maximizing profits on every sale while eliminating the frequent guesswork and human error in structuring the financing of sales at a dealer level. In particular, it is desired to have the ability to guarantee approval for deals made within a lender's guidelines and to have guideline interpretation capabilities that work for the dealer's benefit. A system with such capability would allow more profit per sale by communicating to the manager the maximum possible loan advance on each sale and the maximum payment each borrower can make. The customer satisfaction index (CSI) would improve since dealer rewrites and unwinds of incorrectly structured deals outside of lenders' guidelines (as may now occur for certain sales such as those made in evenings and on weekends) would be eliminated. With the proper system, sales managers could maximize sales and deliver products with confidence.

In a vehicle dealership setting, namely, a car dealer, profits are typically made at the front-end of a deal by the sales department and at the back-end of a deal by the finance and insurance (F&I) department. Traditionally, these departments do not pool profits; rather, each department attempts to maximize its own profits. This lack of cooperation between departments can lead to a number of problems.

One problem is that a salesperson does not have an incentive to spend the time necessary to write up every customer and give their offer to the desk manager for consideration if there is not sufficient front-end profit for a reasonable commission. However, if there was a way to pay the salesperson on both the front-end gross profit and back-end gross profit, the salesperson would be encouraged and potentially rewarded for writing up every customer. The results are several-fold: the salespeople and desk manager will co-operate with the F&I manager and every one will work as a team, the salespeople can concentrate on their primary job function, the salespeople will make more vehicle sales and thus commissions, and the salespeople will have a larger customer base to call for referrals and repeat business.

What is needed, therefore, is a system which can give the desk manager the tools to structure the deal under dealer and lender guidelines and at the same time calculate the dealer's true profit (i.e., front- and back-end profit combined) so that it can be quickly determined if a deal is possible. This will allow a loan to be structured as lender approved and dealer profitable before the deal proceeds into the finance department. Thus, if the lender's guidelines are known by such a system, the desk manager knows how to get the customer's loan structured so that it will be approved. The desk manager will then be able to transfer the deal to the finance office knowing that the F&I manager will verify the information entered into the system to ascertain the approval. Once the information has been verified, the dealer knows that the customer will be financed and that the vehicle can be delivered to the customer. As an added benefit, a customer cannot purchase a vehicle more expensive than he or she can afford, and may obtain delivery of the vehicle at any time the dealership is open, including evenings and weekends when most lending institutions are closed.

SUMMARY OF THE INVENTION

The present invention provides a transaction management system designed specifically for the Desk Manager, alternatively the sales manager, and the F&I Manager to sell more cars, generate the greatest possible profit on each sale and guarantee purchase by a lending institution. The system is pre-programmed with various lender guidelines and rates, and based upon the borrowers credit profile, automatically selects the "best fit" or most profitable finance program available to the dealership from a master list of finance programs. The system retrieves credit bureau reports and also allows the dealer to access merged credit bureau reports (i.e., reports from two or more credit bureaus) according to the requirements of the pre-programmed list of lenders. This feature speeds up time spent interpreting credit bureau reports by reducing the time spent analyzing customer credit, and reduces human errors or oversights which happen during busy times at a dealership. The ability to automatically select the "best fit" finance program at anytime the dealership is open, including accurate interpretation of credit reports, leads to quick progression of the deal and delivery of the product.

This system enables the Desk Manager to maximize profits on every sale while eliminating the frequent guesswork and human error in structuring the financing of sales at the dealership level. At any given instant while the Desk Manager is structuring a deal, the system displays a true total profit including each category of front-end and back-end profit. The Desk Manager can make more sales and deliver more cars knowing the total profit of the deal including back end income and sources from which the income is derived, such as front-end gross, finance reserve, insurance, and service contract. Because the Desk Manager has knowledge of the total profit, a deal that may have been unacceptable using prior techniques, e.g., a deal with no front-end gross profit, can be acceptable with the present system.

In one aspect of the present invention, in a data processing unit having a memory and a visual display, and capable of executing software code, a method of validating the sale of an asset, comprises the steps of providing a sales price of the asset in the memory; providing a cost of the asset in the memory; determining a gross profit from the cost and the sales price by execution of the software code; providing a back-end profit in the memory; comparing a total profit, summed from the gross profit and the back-end profit, with a predetermined threshold by execution of the software code; validating the sale of the asset if the total profit is greater than the threshold; and providing visual feedback on the visual display to a user in response to the validating step.

In another aspect of the present invention, in a data processing unit having a memory and capable of executing software code, a method of selecting a best financial program from a rank ordered, plurality of financial programs, comprises the steps of: (1) providing a sales price of an asset; (2) retrieving a credit score unique to a customer from the memory; (3) retrieving one or more credit questions from the memory; (4) receiving a credit answer, indicative of the customer, responsive to each of the credit questions; (5) selecting one of the financial programs based upon the credit score and the credit answers; and (6) iterating steps (3) through (5) until a best financial program is selected.

In yet another aspect of the present invention, in a data processing unit having a memory and a visual display, and capable of executing software code, a method of maximizing the profit of a sales transaction for an asset, comprises the steps of providing a sales price of the asset in the memory; providing a cost of the asset in the memory; determining a back-end profit by execution of the software code; providing a front-end profit in the memory; selecting a best financial program from a rank ordered, plurality of financial programs; and structuring the transaction based on said sales price, cost, and selected financial program so as to maximize the sum of the front-end profit and the back-end profit.

BRIEF DESCRIPTION OF THE DRAWINGS

FIG. 5 is an exemplary first pencil screen display generated as part of the flow of FIG. 4;

FIG. 6 is an exemplary four-square screen display or printout generated as part of the flow of FIG. 4;

FIGS. 7a and 7b are a flow diagram of the Presume Term module shown in FIGS. 3 and 4;

DETAILED DESCRIPTION OF THE PREFERRED EMBODIMENTS

Reference is now made to the drawings wherein like numerals refer to like parts throughout.

For convenience, the following description will be organized into the following seven principal sections: System Model, Hardware Configuration, System Overview, First Pencil Overview, First Pencil Modules, Financial Source Filter, and Conclusion.

I. SYSTEM MODEL

Figure 1:
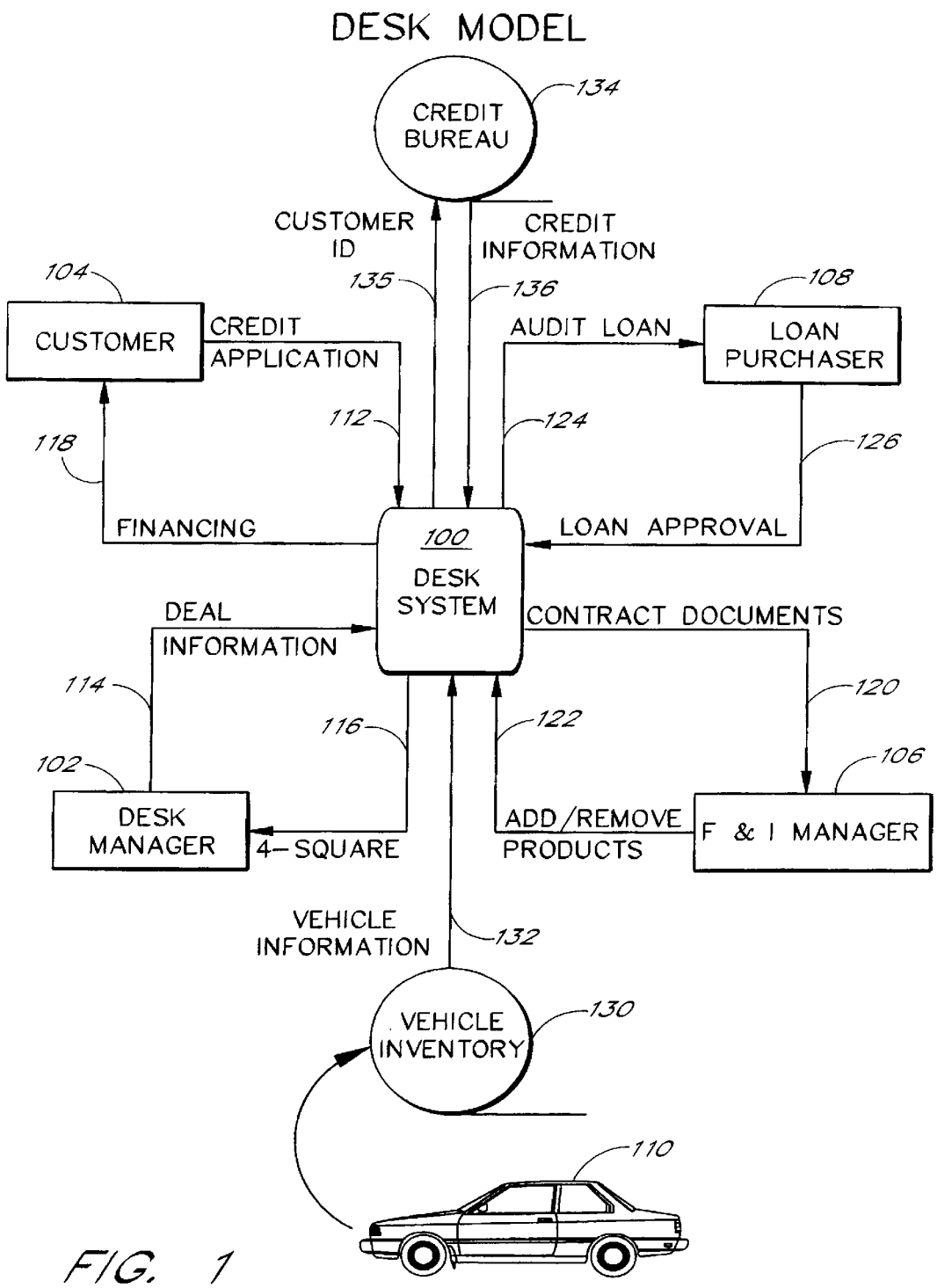
FIG. 1 is a schematic model of the desk system, which is a preferred embodiment of the present invention.

As shown in FIG. 1, a transaction management system 100, comprising a computer and software, is also referred to as the "Desk System" or "Decision Flex". The system has applicability to vehicle transactions in general but will be described in conjunction with the embodiment directed to auto dealers.

The system 100 is an expert system that, based on an vehicle buyer's budget data, credit history, and vehicle information, automatically structures a transaction to qualify for the most appropriate finance or lease program tier known to the system 100. At the same time, the system 100 provides an auto dealer with a variety of tools to quickly manipulate components of the deal structure, override program tiers (with resultant deviation indications), print transaction documents for buyer execution and accurately determine real profit. In the presently preferred system, real profit is broken out by vehicle, factory holdback, factory incentives, finance reserve and financed product profits. The computer and software provide all the important functions offered by the leading (Finance and Insurance) F&I computer systems in the industry, plus many more revolutionary features that are not available with any other system. This unique, system is "user friendly" with on-screen instructions, menus and hot keys to work deals step by step, and allows the user to move easily and speedily from one screen to the next.

In the auto industry there are several different sales systems. In these many sales systems certain terminology has been adapted to describe the job functions of different sales employees. The term "desk manager" is used in several of the different sales systems in the auto industry. The definition of the job function of the desk manager 102 as it pertains to the computer system 100 of the present invention is simple. The desk manager 102 is referred to as the individual who operates the desk system 100. This is the person who structures the deal for the salesperson or "closer." The reader may consider anyone who does this function in the automobile agency to be a desk manager. In many dealerships, the sales manager is also the desk manager, but not always. The new car or used car manager can also be the desk manager. The only true "desk manager" 102 is the one who negotiates the deal through the salesperson or closer and creates the deal structure from the sales desk. In the majority of dealerships, the desk manager 102 will also perform another function, such as new car, used car or sales manager or, in some smaller stores, the general sales manager or the F&I manager will also be the desk manager 102. But in every instance, the desk manager 102 is the person who has control of the structure and profitability of the sale. The desk manager 102 may also be referred to as a member of the sales management hereinbelow.

Returning to the overview and FIG. 1, within seconds of entering vehicle (or asset) information 132 (e.g., year, make, model, mileage, sales price and cost), the system 100 provides a "first pencil four-square" 116 for negotiation with the prospective buyer or customer 104. In other embodiments, the system 100 may use other vehicle information, such as stock number and sales price to initiate the process of providing the first pencil four square. The "first pencil four-square" 116 is a structure display (see FIG. 6 for an example), which includes price, rate, term, down/trade, that indicates an acceptable deal for the worst-case finance program tier. A "pencil" is a term used to describe a structure that is offered to the customer 104. An example of a first pencil screen display as processed by the system 100 is shown in FIG. 5. Traditionally, the four-square format is used as a means of communicating "pencils" between the sales management and the salespeople in auto dealerships, and is a simplified way of summarizing the information of the pencil.

After the salesperson is sent back to the customer 104 with the first pencil, sales management uses the customer's credit application 112 to derive customer identification 135 used to access one or more credit bureaus 134. The customer's credit application 112 and the received credit bureau information 136, which includes a credit score, are then used to answer a series of questions prompted by the system 100 concerning budget, employment, residence and credit history (collectively, 114). By the time the salesperson has returned with a counteroffer or acceptance from the customer 104 on the first pencil, the system will have determined if the customer 104 qualifies for a finance program or financing 118 other than the worst case scenario envisioned by the first pencil. In addition, the presently preferred system 100 provides profitability statistics for the front-end gross, the back-end profits, finance reserve amounts, insurance commissions, and service contract commission. Of course, other statistics may be provided in other embodiments of the system 100. With this information, sales management 102 is able to quickly analyze counter-offers and determine the most profitable deal that fits the customer's budget and available finance program guidelines.

During the negotiation process, many variables may be manipulated (e.g., selling price, interest rate, down payment, financed products, trade allowance, loan term, etc.). The Decision Flex system 100 allows the sales management 102 to instantly track profit and finance program guideline adherence on a real-time basis so that when a deal is accepted, there is no question that it is profitable and that the sales contract will be purchased by a finance source, loan purchaser or lender 108, which grants loan approval 126. The system 100 assists the sales management 102 during negotiations by doing complex calculations via simple commands such as rolls to payments, price, out-the-door figures; calculates maximum advance and budget calculations to bring a sale within guidelines; and performs complex iterative calculations. The system 100 provides fast, seamless movement between different finance programs and tiers without re-entries or loss of the original input data.

The presently preferred system utilizes a plurality of finance program tiers which may be associated with one or more finance sources 108. In an alternate embodiment of the invention, the system 100 interfaces with a finance source clearinghouse (not shown) instead of directly with a finance source 108. In such an embodiment, after the dealer has structured an acceptable deal, an extract file representing the deal is sent to the clearinghouse. The clearinghouse selects an appropriate lender based on a best fit for the particular deal and then forwards the deal onto the selected lender. For example, the clearinghouse may have access to any of 50 or more finance sources. Thus, any one loan program could be associated with a number of different finance sources.

Because the Decision Flex system 100 dictates a structured approach to negotiation, every deal is worked in a consistent manner. This provides three major benefits: (i) maximum profitability can be attained without guessing during the heat of a negotiation, (ii) the vehicle 110 can be spot delivered to the customer 104 with confidence that the sales contract will be purchased by a finance source 108 indicated by the system 100, and (iii) all customers 104, regardless of budget or credit characteristics can be treated in an impartial, consistent, professional and legal fashion thus enhancing the dealer's Customer Satisfaction Index which is a key indicator to the vehicle manufacturers when evaluating dealerships. These benefits give dealership management real control over a sales force that might otherwise utilize a variety of ineffective or illegal sales techniques which can wreak havoc with the dealership's bottom line. An additional benefit is that sales experience becomes less of a factor when recruiting new personnel because the system 100 dictates the negotiation process.

The system 100 also stores a complete chronology of the negotiation process including a detailed structure, i.e., "pencil", of each counteroffer that is presented to the customer. If a deal has two, three, or more pencils, the sales management 102 can review the steps utilized by the salesperson while working the deal. This feature offers two significant advantages: (i) another salesperson can step into the process at anytime with the confidence of knowing what has transpired and (ii) the stored history is invaluable as an aid for correcting current personnel and training new hires.

The Desk System 100 allows the desk manager 102 to follow some very simple steps and answer a series of very simple questions to find out if he has the customer 104 in budget and in the right vehicle. The system 100 will determine if the loan advance percentage is correct for the finance program for which the customer 104 is eligible.

As the prime user of the desk system 100, the objectives of the desk manager 102 will be briefly discussed. The desk manager 102 must structure the deals correctly the first time by collecting and checking all information on the credit application 112 and the credit bureau reports 136, and inputting this information into the desk system 100 correctly. This will eliminate unwinds and customer rewrites that are embarrassing to the customer 104 and the dealership. The desk manager 102 also aids the F&I manager 106 in closing.

A major objective of the desk manager 102 is to increase the profits. This is accomplished by maximizing the total gross profit on every deal. To achieve this goal, the desk manager 102 must be concerned about the total profit rather than the front-end profit only (see FIG. 14). For example, if a customer 104 is a "price buyer" (the selling price is the most important criteria), the desk manager 102 will lower the selling price of the car to retain the customer and then work the back-end profit to maximize the total profit of the deal. With this procedure, the desk manager 102 can structure a deal with an acceptable profit even if the customer 104 is only willing to pay invoice.

As a user of the desk system 100, the objectives of the F&I manager job will be briefly discussed. The primary objective of the F&I manager 106 is to make sure that all customers are happy with their purchase and they understand the cost of the vehicle 110 and any additional accessories or aftermarket products 122. The desk system 100 provides a set of contract documents 120 to facilitate the tasks of the F&I manager 106.

The F&I manager 106 must ensure the customer 104 is satisfied with all aspects of the sale, so that the dealership retains a 100% CSI (customer satisfaction index). If the customer 104 is not completely satisfied with the purchase, the deal must be rewritten or re-negotiated. With this procedure, the dealership will always have a positive word-of-mouth reference in the marketplace and be sure all of their customers 104 are happy and are qualified to be considered for referrals or repeat business.

These objectives require that the desk manager 102 and the F&I manager 106 work in total harmony and cooperation as a team. By meeting these objectives the dealership will achieve its ultimate goals: a) 100% CSI, b) increased profits, and c) increased car sales.

By achieving these objectives, the sales management will create a happy customer base, a pleasant work environment based on total teamwork and cooperation between departments and healthier paychecks for salespeople and himself as well as fostering a closer relationship with the lenders 108 and the auto manufacturer.

II. HARDWARE CONFIGURATION

Figure 2:
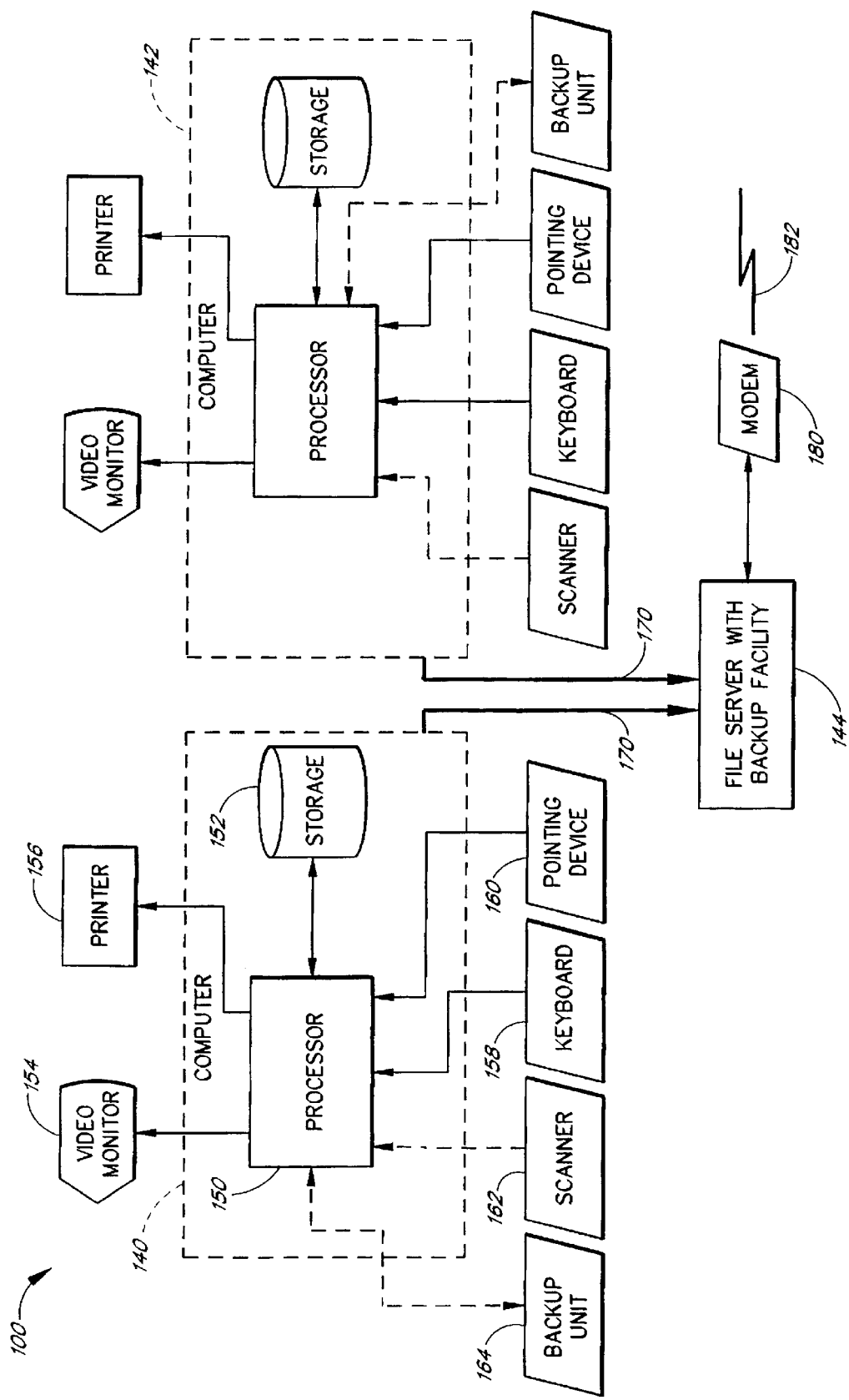
FIG. 2 is a block diagram of an exemplary hardware configuration of the desk system shown in FIG. 1.

Referring to FIG. 2, an embodiment of a transaction management system of the present invention is generally indicated at 100. As shown in FIG. 2, the desk system 100 can be installed as part of a network configuration. Alternatively, the system 100 can be operated in a stand-alone configuration. In general terms, the inventive ideas underlying the system 100 could be used in other applications where it is desirable to conduct a transaction for an asset. One such application is shown in FIG. 2, which shows the system 100 in a network configuration. Such a system preferably includes a workstation or computer 140 used by the desk manager 102, a computer 142 used by the F&I manager 106, and a file server 144. The computers 140, 142 include a server interface (not shown). The server 144 is typically part of a network, such as a LAN (local area network) 170, that connects to each server interface in the computers 140, 142. Additional computers similar to computers 140 or 142, along with their peripherals, may be added to the network as required by a dealership. The system 100 is an integrated system which transfers data from the sales department to the F&I department or visa versa. This elimination of time-consuming data re-entry by the F&I manager is especially helpful to the dealer during busy times.

The desk system 100 includes an advanced transaction management program operating in the MS-DOS, version 6.2 or later, operating system, available from Microsoft Corporation, on computers 140, 142. Although this embodiment is described using the MS-DOS environment on a personal computer, other embodiments may use a different operational environment or a different computer or both.

The presently preferred file server 144 operates under Netware, version 3.11 or later, network software available from Novell and supports up to 250 computers or workstations at a time. The file server 144 is configured as a standard file server and includes a backup facility, i.e., a second server identical to the server 144. The architecture of the system 100 uses system fault tolerance technology to run both servers concurrently. In the unlikely event of a server failure, the failing server is dropped from the network and the remaining good server continues operation without losing valuable time or data. In another embodiment, other backup methods, such as disk mirroring techniques may be used in place of the second server.

The entire system 100 is linked by a high speed modem 180 to a dealer support center via a communications line 182 for quick software maintenance, upgrades, and continuous on-line support. The system 100 is also linked via modem 180 and line 182 to the lender(s) 108 utilizing an electronic mail (E-mail) system that runs under the network operating system. The presently preferred E-Mail system is Microsoft Mail Remote, version 3.2a. This maximizes a manager's time and productivity by allowing the F&I and desk managers to communicate with the lenders 108 via electronic mail instead of leaving telephone messages. If the lender 108 has a question about a deal and wants to ask the F&I manager 106 about it, the lender 108 types in the question and electronically transmits the question to the dealership without interrupting the F&I manager 106. The F&I manager 106 reads and responds as time allows, thereby expediting the entire communication process. By using the E-mail system, every communication between dealer personnel and the lenders 108 is accumulated, eliminating misunderstandings on shift switching or other problem situations. The electronic communication capability can also be used within the dealership to free up phone lines, thus eliminating untimely interruptions between sales managers, F&I managers, general managers and business office personnel. Optionally, the E-mail system can also be used to communicate with other dealerships having the system 100.

The modem 180 and line 182 may also be used as a dial-up, point to point connection, to enable a structured deal to be transferred to a loan purchaser 108. Uploading a deal structure to a lender's host system allows a loan to be processed quicker than traditional methods.

In an alternate embodiment of the invention, either the computer 140 (in small dealerships without the server 144) or the server 144 is connected via a wide area network (WAN) connection to the finance source or loan purchaser 108. A WAN connection to the finance source's host system enables a completed deal structure to be uploaded to the finance source for quicker loan processing. As a variation of this embodiment, the deal structure is uploaded to a finance source clearinghouse, which then further processes and distributes the loan request to a selected loan source 108.

Referring again to FIG. 2, the presently preferred system 100 includes a computer 140, having a minimum of an Intel 80486 or similar microprocessor running at 33 MHz in the presently preferred embodiment. The discussion for computer 140 applies for computer 142 as well, i.e., in a typical dealership, both computers 140 and 142 will be similarly equipped or configured. The computer 140 includes a minimum of four megabytes (MB) of RAM memory (not shown). The system 100 includes a hard disk drive 152 connected to the processor 150. The hard drive 152 is optional in the network configuration, i.e., the workstation uses a hard disk or other storage device in the file server 144. If computer 140 is used in the stand-alone configuration, the hard drive 152 is preferably 240 Mbytes or more.

The computer 140 is integrated with a group of computer peripherals, and is connected to a VGA (video graphics array) display standard, or better, color video monitor 154, which is required to use all the features of the system 100. A keyboard 158 that is compatible with IBM AT type computers is connected to the computer 140. A pointing device 160, such as a two or three button mouse also connects to the computer 140. Reference to use of the mouse is not meant to preclude use of another type of pointing device.

The computer 140 connects to a printer 156 to provide a way to produce hard-copy output, such as forms to be signed by the customer. The presently preferred printer is a model 320 dot-matrix printer available from Oki, although the system 100 could be adapted to use other available printers. This printer 156 supports multiple part forms necessary for the legal and financial transactions.

Several optional components that provide additional flexibility in use of the system 100 will now be described. An optional way to capture a form, such as a credit application, is by use of a scanner 162 connected to the computer 140. The scanner can also be used to scan completed forms signed by the customer for electronic transfer to the loan purchaser or lender 108 of the documents necessary for a loan audit 124 (FIG. 1). Note, however, that the use of the scanner may be economically inefficient for smaller dealerships. If the forms are not scanned into the system and electronically forwarded, an alternate and preferred way to transfer the completed and signed forms for the loan audit 124 is via a mail service, such as Federal Express. One presently preferred scanner 162 for system 100 is a Scanjet 2c scanner available from Hewlett-Packard.

In small dealerships, especially where the desk manager may also have the job of F&I manager, the system 100 may be installed in a stand-alone configuration, wherein only one workstation is used, and thus the server 144 is not required. In this configuration, a backup device 164, such as a Jumbo 250 Mb cartridge tape back-up unit, available from Colorado Memory Systems, is preferably connected to the computer 140. A hard drive 152 or other similar device is required in the stand-alone configuration.

In an alternate embodiment of a stand-alone configuration, or as one of the workstations of a network configuration, the system 100 may include a portable computer, such as a laptop or notebook computer, e.g., a Premium Executive 386SX/20, available from AST Research, or other computers available from a plurality of vendors. The portable computer (not shown) is equipped with components similar to that described in conjunction with computer 140.

A portion of the software programs that are performed on the hardware shown in FIG. 2 is included in the attached microfiche appendix. The source code is written in Clipper, version 5.2d, available from Computer Associates. Clipper compiles to object code that is linked by Exospace, version 1.0f, also available from Computer Associates. Clipper also creates and maintains the databases used by the programs. The structure of the Credques, Credans, Notes, and Dealfile databases is also included in the microfiche appendix.

It will be understood by one skilled in the technology that a programmed computer can also be implemented completely or partially with custom circuitry. Therefore, the chosen implementation should not be considered restrictive in any matter.

III. SYSTEM OVERVIEW

Figure 3A:
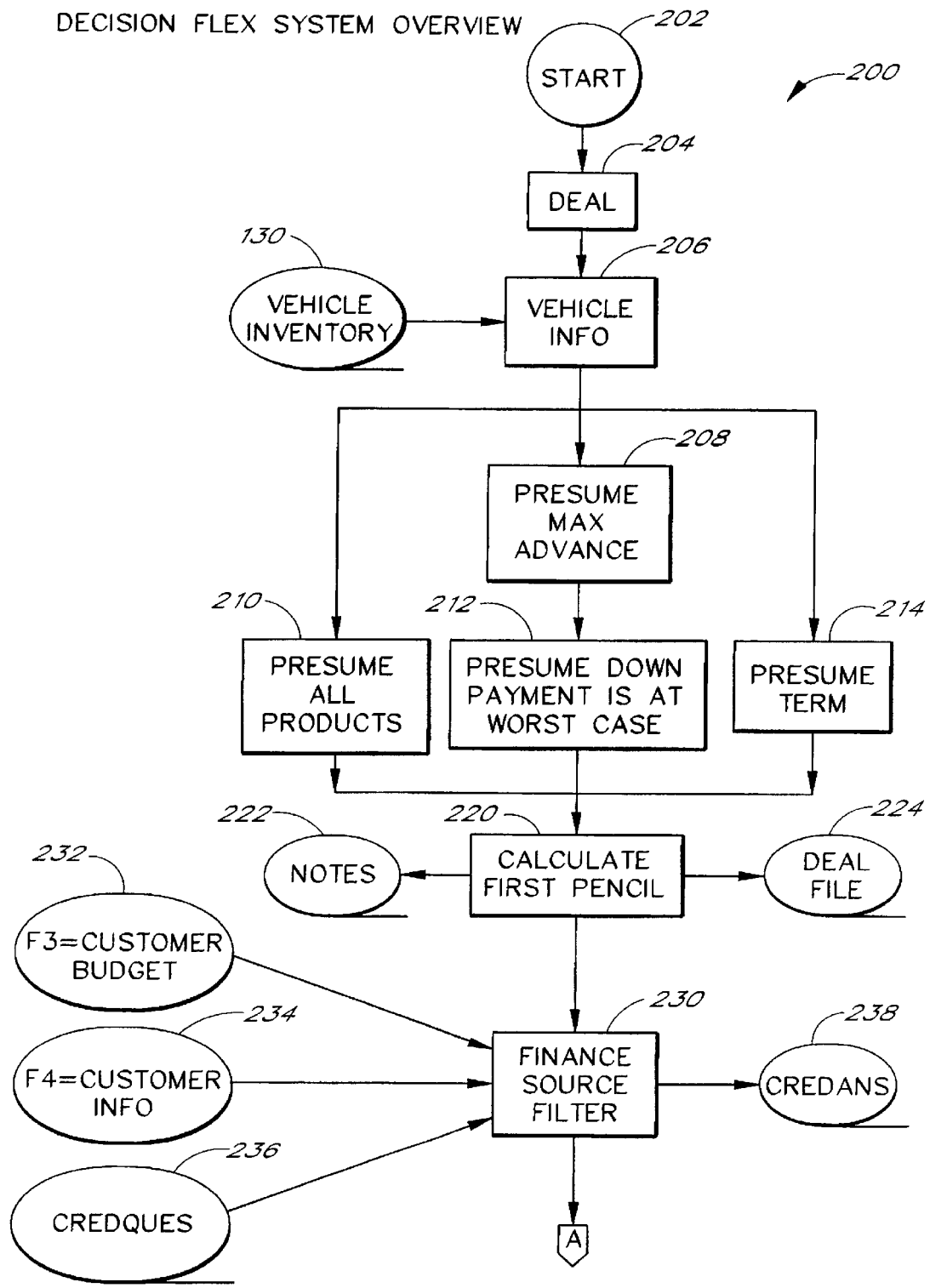
FIGS. 3a and 3b are a system overview flow diagram of the desk system software that operates on the desk system shown in FIGS. 1 and 2.
Figure 3B:
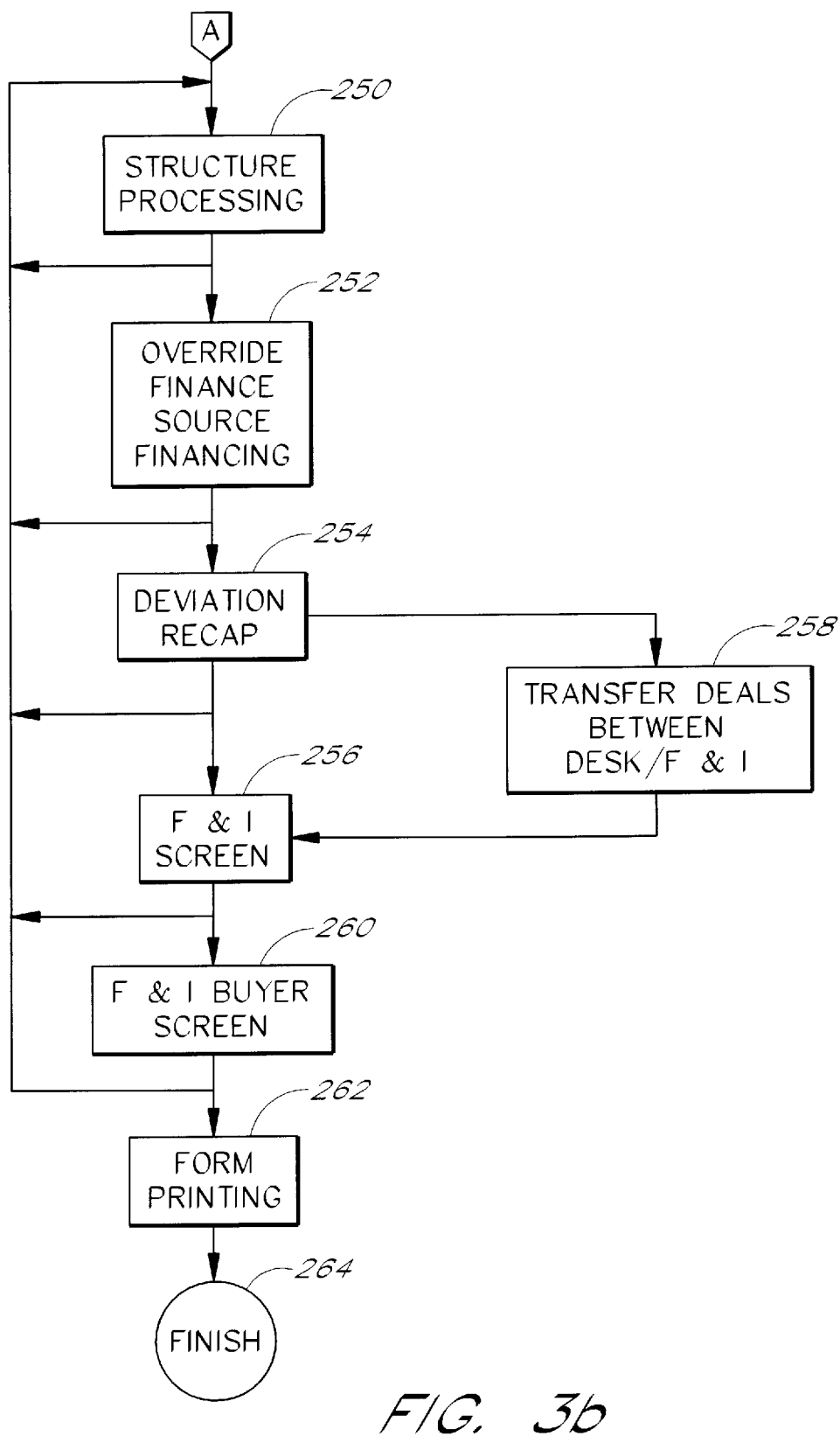

Referring to FIGS. 3a and 3b, an overview 200 of the Decision Flex system 100 will be given. The system 100 automates many tasks for the desk manager 102 previously performed using a scratch pad or a calculator. In addition, expert system features are incorporated into the system 100. The primary output of the system 100 is a deal that will be accepted by a finance source or lender 108. A unique feature of the system is that front-end and back-end profits are pooled and shared by the sales department and F&I department typical in nearly all dealerships. Thus, a dealership using system 100 will experience greater cooperation between the departments. Another unique aspect is that the system 100 utilizes a structure to direct the customer to the most appropriate finance source.

The process described by the overview 200 is performed by computer 140 or 142 executing the programs (mentioned above) in system 100. The system overview 200 begins at a start state 202 on FIG. 3a and proceeds to a series of states or modules described hereinbelow and completes at a finish state 264 on FIG. 3b.

Deal Module 204

The system supports various types of deal processing such as a new deal, recalling a deal and so forth. The discussion hereinbelow is primarily concerned with a New Deal and will concentrate on this aspect. New Deal is used when a customer is interested in a particular vehicle for the first time. If the same customer returns to the dealership at a later time and desires to continue negotiating a deal on the same vehicle, the desk or F&I manager would instead use a Recall Deal feature which essentially allows the manager to bypass initial modules 206 to 220 and continue at a Financial Source Filter module 230 described hereinbelow. In a New Deal situation, the manager determines whether the deal will be a cash, lease or finance transaction and enters that information into the computer 140 (FIG. 2). All the following modules apply to the finance transaction type. A cash transaction type only uses modules 206, 256, 260 and 262. A lease transaction uses a different set of modules not shown in this embodiment.

Vehicle Information Module 206

The Vehicle Information module 206 provides basic information about the vehicle to be purchased 110 and the customer 104. A vehicle inventory database 130 which provides vehicle information is used by module 206. Information, such as whether the vehicle is new or used and the manufacturer's invoice price or Wholesale Book value of the vehicle is used by subsequent modules of the system 100. The Vehicle Information module 206 will be further described in conjunction with FIG. 4.

Presume Max Advance Module 208

Using the worst case loan program, the Presume Max Advance module 208 utilizes the invoice price or Wholesale Book value of the vehicle provided by the Vehicle Information module 206 to determine a maximum advance percentage of the invoice price (new vehicle) or Wholesale Book value (used vehicle) to be the amount financed. The Wholesale Book value is utilized for used vehicles. The Presume Max Advance module 208 will be further described in conjunction with FIG. 4.

Presume All Products Module 210

The Presume All Products module 210 presumes that the customer will choose to purchase life insurance, accident and health (AH) insurance, involuntary unemployment insurance (IUI) and a service contract on the vehicle. The module 210 initially assumes a co-buyer for the vehicle 110 and selects a joint life policy. The module 210 determines the premiums, costs and commissions for the insurance programs. The Presume All Products module 210 will be further described in conjunction with FIG. 4.

Presume Down Payment is at Worst Case Module 212

The Presume Down Payment is at Worst Case module 212 determines the worst-case down payment based on information received from the Vehicle Information module 206 and Presume Max Advance module 208. The Presume Down Payment is at Worst Case module 212 will be further described in conjunction with FIG. 4.

Presume Term Module 214

The Presume Term Module 214 determines the initial loan term to be used by the system 100 in the determination of the first pencil. The module 214 uses information from the Vehicle Information module 206. The Presume Term module 214 will be further described in conjunction with FIG. 4.

Calculate First Pencil Module 220

The Calculate First Pencil module 220 utilizes information, either directly or indirectly, from modules 206 through 214 to determine the set of information known as the first pencil. The first pencil information can be displayed on the visual display 154 (example shown in FIG. 5), printed on the printer 156 or summarized in the four-square format (example shown in FIG. 6). The first pencil structure information is saved in a Notes file 222 for this deal and the field data or information corresponding to the first pencil structure is saved in a deal file 224.

After the system 100 generates the first pencil four-square 116, the desk manager 102 gives it to the salesperson to use in negotiation of the deal. The Calculate First Pencil module 220 will be further described in conjunction with FIG. 4.

Financial Source Filter Module 230

The Financial Source Filter (FSF) module 230 uses expert system techniques to determine the best finance program tier that the customer 104 qualifies for. The FSF module uses information provided by the customer 104 via the credit application 112 and the report provided by one or more credit bureaus 134. The FSF module 230 requests information about the customer 104, and then, based on the answers, determines the next question to be asked. This process continues until the finance program tier that is the best match for the past and present financial condition of the customer is determined. The output of the Financial Source Filter module 230 is used by Structure Processing 250 module to generate a second pencil. The FSF module 230 will be further described in conjunction with FIGS. 12 and 13.

Customer Budget Information 232

The desk manager 102 extracts information related to the customer's budget from the credit application completed and signed by the customer 104. This information is about the current status of the customer, such as gross income and current debts. This information is entered into the computer 140 during execution of the FSF module 230.

Customer Information 234

Figure 12:
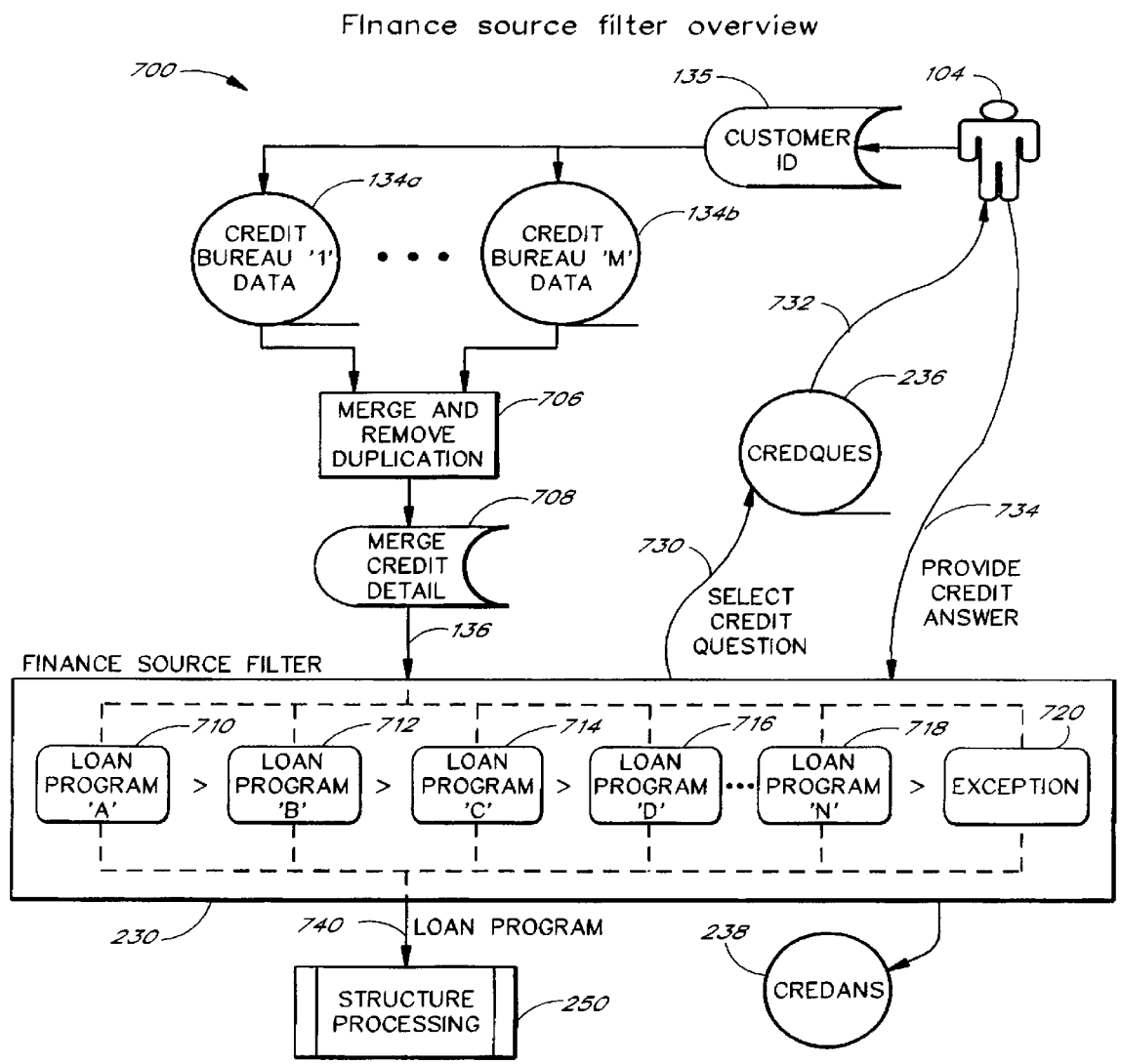
FIG. 12 is an overview diagram of the Financial Source Filter module shown in FIG. 3.
Figure 13:
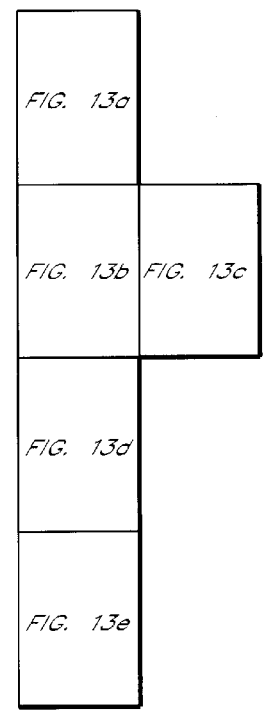
FIG. 13 consisting of FIGS. 13a, 13b, 13c, 13d, and 13e are a flow diagram of the Financial Source Filter module shown in FIGS. 3 and 12.
Figure 13A:
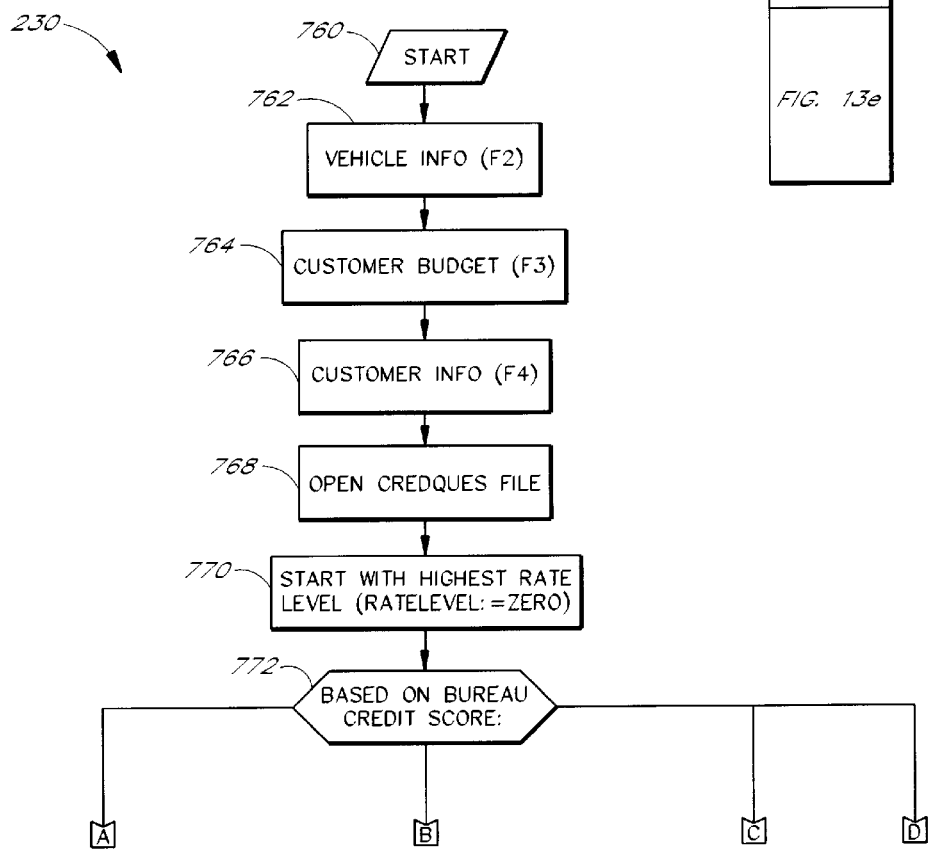

The desk manager 102 extracts information related to the customer's past credit history from the customer's credit report. As shown in FIG. 12 (and discussed hereinbelow), the desk manager 102 runs one or more credit reports 134 on the customer 104 based on the customer's identification. The credit information requested by the system 100 is entered into the computer 140 during the FSF module 230.

CredQues Database 236

The CredQues database 236 includes a set of questions that are asked of the desk manager 102 by the system 100 about the customer 104 during the FSF module 230. The questions are categorized according to the finance programs available to the dealership. Each program is represented by a finance program tier and is associated with a rate level. In the presently preferred system 100, the Credques database 236 utilizes rate levels 0, 10, 20, 30, 40, 50, 60, 70 and 80. Each of these rate levels may have an associated finance program tier. For the presently preferred system 100, the questions at rate level 0 (zero) pertain to all tiers and are used for initial screening. Rate level 10 represents the best credit rating and corresponds with finance program tier A. The rate level to tier correspondence for the presently preferred system 100 is shown in Table 1.

TABLE 1

| Rate Level | Finance Program Tier |
|---|---|
| 0 | all |
| 10 | A |
| 20 | B |
| 30 | C |
| 40 | |
| 50 | |
| 60 | D |

TABLE 1-continued

| Rate Level | Finance Program Tier |
|---|---|
| 70 | E |
| 80 | EA (Exception Application) |

The questions for the database 236 are presently manually generated whenever the lender 108 issues new guidelines for the finance program. The guidelines are typically updated several times a year.

CredAns Database 238

The CredAns database 238 includes a set of records for each customer 104 based on the answers to the questions asked by the system 100 from the CredQues database 236. As defined in the system 100, the set of records for each customer 104 is the customer's credit profile. The CredAns database 238 is written for one customer 104 during the operation of the FSF module 230.

Structure Processing Module 250

Structure Processing can be considered the main negotiation phase. The Structure Processing module 250 allows the desk manager 102 to generate a second pencil that is customized to the results of the output of the Financial Source Filter (FSF) module 230. Thus, the customer's credit bureau information and credit application information are utilized by the system 100 to produce a more accurate deal structure than what the First Pencil module generated. The Structure Processing module 250 is similar in structure and processing to the Calculate First Pencil module 220, but instead of utilizing the output of the Presume Term module 214, Presume Max Advance module 208 and Presume Down Payment module 212, the information processed during the FSF module 230 and the information stored in the Deal file 224 is utilized. Additionally, vehicle trade-in information is entered into the system 100 at this module. Dealership personnel will use the condition, age, mileage, and other factors to determine the wholesale value of the vehicle. The payoff amount, if any, is also determined to produce a net positive or negative amount that is considered the net trade value.

The desk manager can utilize this module 250 to maximize profits by adjusting one or more of the interest rate, the term of the loan (depending on the amount financed and the advance percentage), the down payment (to maximize the advance percentage), and products.

At the completion of the Structure Processing module 250, a new four-square is generated and used by the salesperson to negotiate with the customer 104. If the customer still does not accept the deal at this point, the system allows a counter-offer to be entered into the system 100 by looping back to the Structure Processing module 250 as shown in FIG. 3b as a third or subsequent pencil. Alternatively, after the completion of any of the modules 252, 254, 256 or 260, including the case where the deal has been transferred between desk and F&I at decision state 258, the system 100 could loop back to module 250 to generate a third or subsequent pencil.

Override Finance Source Financing Module 252

A well-trained or experienced desk or F&I manager knows what will improve the finance program tier of a particular customer. With the proper documentation, an answer to a credit question can be overridden and the financing request then becomes known as an exception application, i.e., a deal that does not meet criteria embedded in the FSF module guidelines. By performing an override of one or more criteria, a customer may be bumped to a more favorable finance program tier which also increases the profit to the dealership.

If an override is performed, credit questions for the new finance program tier, similar to those in the FSF module 230 are asked by the system 100. The system will also request the desk or F&I manager to get approval from the lender 108. In the presently preferred system, a message "Call for Approval" is displayed on part of the visual display 154 (FIG. 2). At the completion of module 252, the desk manager has the option of sending the deal back to the Structure Processing module 250 to modify the deal or continuing at the Deviation Recap module 254 if the deal is to continue.

Deviation Recap Module 254

The Deviation Recap module 254 lists the criteria or questions that were overridden by the desk or F&I manager in the form of a Deviation Summary, i.e., what caused the problem. For each deviation in the summary, the manager must give a reason for the deviation. If the desk manager is making the override, at the completion of module 254, he has the option of transferring the deal to the F&I department. In a small dealership wherein one person handles both desk and F&I duties, the path is from module 254 to module 256, whereas in a dealership having two people to handle the desk and F&I duties, the path is from module 254 to module 258. As a further option at the completion of module 254, the desk manager can send the deal back to the Structure Processing module 250 to modify the deal.

Transfer Deals Module 258

When the desk manager 102 is satisfied with the current deal, the system 100 continues processing of the deal at the Transfer Deals Between Desk AND F&I module 258 by effecting a transfer of the deal to the F&I department. The desk manager 102 selects a "Transfer to F&I" menu item on the visual display 154 which then initiates the transfer of the deal to the F&I department. The desk manager 102 is then locked out from further changes so that the F&I manager can begin work on the deal knowing that the desk manager is satisfied with the deal and will not change the deal (unless the deal is not approved by the F&I manager, as described hereinbelow).

F&I Screen Module 256

The F&I manager 106 handles various F&I type tasks during the F&I Screen module 256, with a main goal being to sell products. During the operation of module 256, the F&I manager reviews the deal received from the desk manager to determine if it is acceptable according to the F&I department's standards. If the deal is not acceptable, the F&I manager 106 sends the deal back to the Structure Processing module 250, wherein the desk manager 102 restructures the deal with the customer 104 to make it acceptable. If the customer 104 has declined the insurance programs determined during the Presume All Products module 210, the F&I manager 106 explains the benefits and advantages of each insurance program to the customer and requests reconsideration. The F&I manager 106 handles the service contract in a similar manner. A protection package which includes etching an identification number on key components of the vehicle is also explained. If the customer 104 has previously accepted or just accepted the purchase of any of these products, the F&I manager 106 gets the necessary information from the customer to enter into the computer 142 that is running the software of process 200. The F&I manager requests other miscellaneous information during this module 256, such as bank references. If the deal includes a trade-in, the F&I manager requests the necessary information and paperwork from the customer 104 such as the vehicle title. At the completion of module 256, the F&I manager has the option of sending the deal back to the desk manager at the Structure Processing module 250 (if the deal was not approved by the F&I manager) or continuing at the F&I Buyer Screen module 260.

F&I Buyer Screen Module 260

The F&I manager enters into the system 100 and verifies information about the customer 104, such as address, telephone number, social security number. If a co-buyer is listed on the loan, information is verified on the co-buyer also. If the Desk Manager answers a guideline deviation, the F&I Manager must re-answer the deviations and state the reason in a F&I memorandum. At the completion of module 260, the F&I manager has the option of sending the deal back to the desk manager at the Structure Processing module 250 or continuing to the Forms Printing module 262.

Forms Printing Module 262

The system 100 is capable of printing all desk and F&I forms and documents. The system provides the printing capabilities required of a desk manager and F&I manager, including specific internal forms for Department of Motor Vehicle (DMV) documents, product forms, and sales contracts. State-of-the-art "smart printers" are pre-programmed to align each form automatically and correctly for clean, professional paperwork in a fraction of the time previously needed. The Forms module 262 adjusts for physical differences of the form from lot to lot. Module 262 includes an "intelligent" forms routine that only shows the applicable forms necessary for the current deal. When a particular form is selected, information is requested for data not already saved in the system 100. Each particular form is saved permanently in the system 100 for any future reference. After the forms have been completed, the deal information is transferred to the lender or loan purchaser 108. At the completion of the module 262, the process 200 has completed the deal for the vehicle 110 and customer 104 and proceeds to the finish state 264.

Of course, in the network embodiment of the system 100, other deals for other vehicles and customers may be handled concurrently with the above-described transaction for a single customer. In a single computer embodiment of the system 100 (wherein the desk and F&I manager are the same person), the system 100 is ready to work on another deal at the completion of a deal, or when the deal is saved for subsequent action, or when the deal is abandoned.

IV. FIRST PENCIL OVERVIEW

Figure 4:
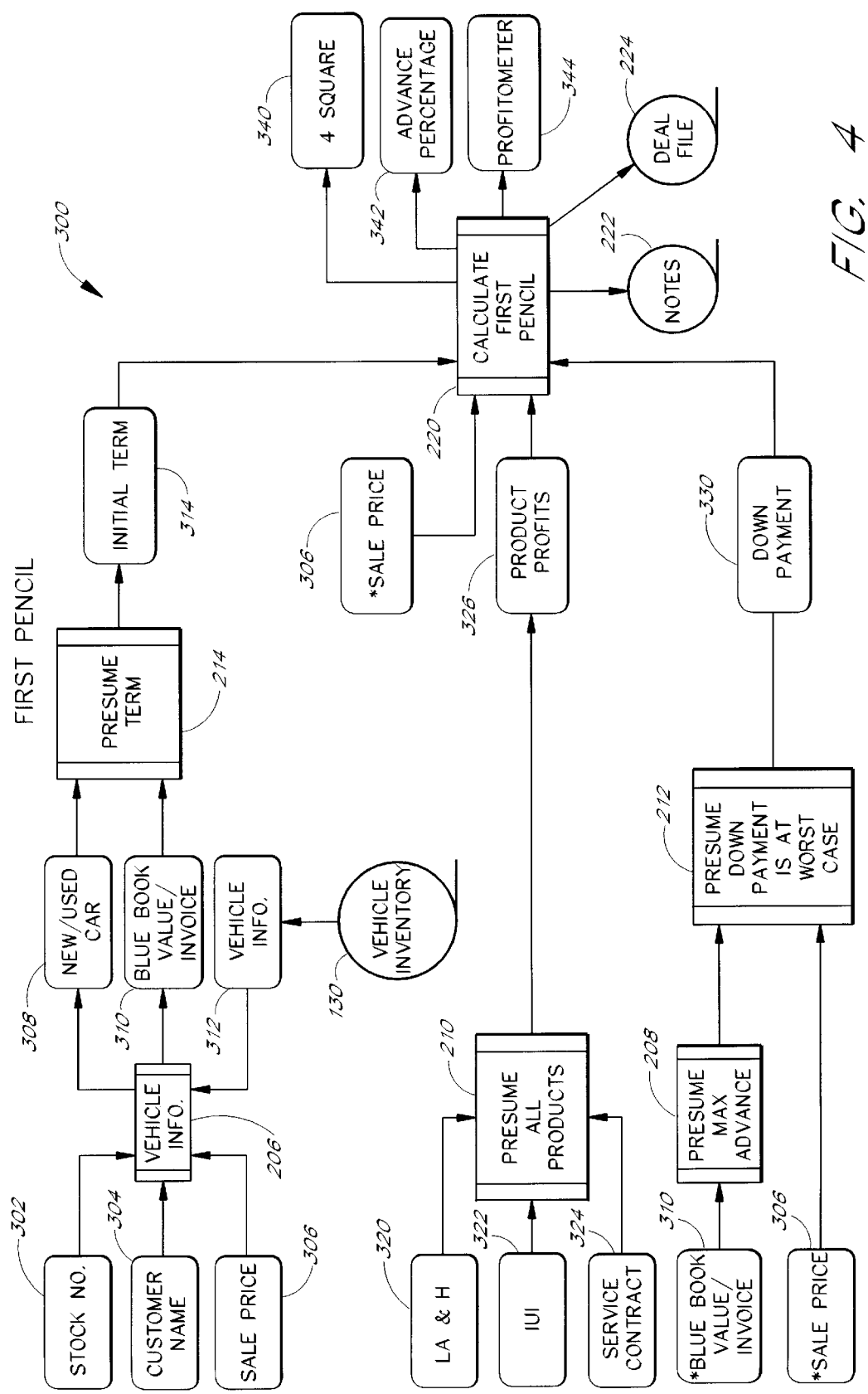
FIG. 4 is flow diagram of the Calculate First Pencil module and associated input modules shown in FIG. 3.

Referring to FIG. 4, a high level view of the first pencil process 300 is presented. FIG. 4 presents the modules 206–220, previously described in conjunction with FIG. 3, and it shows the main inputs and outputs for each module.

A. Vehicle Information Module 206

During the operation of the Vehicle Information Module 206, the system 100 displays a Vehicle Information screen to the desk manager 102 on the visual display 154. At the Vehicle Information screen, the desk manager 102 enters the Dealer Stock Number 302 to automatically retrieve Vehicle Information 312 such as make, model, year, odometer, color, new or used 308, and vehicle cost 310 from the Vehicle Inventory file 130. A Customer's Name 304 and Target Selling Price 306 are also entered onto this screen.

In an alternate embodiment of the system 100, the desk manager 102 could enter a Vehicle Identification Number (VIN) to uniquely identify the vehicle 110 for which the deal will be generated. Alternatively, by entering data corresponding to a subset of the following fields, which are part of the Vehicle Inventory database 130, the desk manager 102 can identify all existing vehicles in the database with specified attributes.

A. Registered Vehicle—Enter "Y" if vehicle is used; "N" if new.
B. Vehicle Year—Enter last two numbers of vehicle year.
C. Vehicle Make—Enter four letter abbreviation for Vehicle Make. If the abbreviation is not known, the system provides a help facility wherein a list of manufacturers and the appropriate abbreviation appears in a window to the right of the display 154.
D. Vehicle Model—Manually type the name of vehicle's model or use the help facility to access a list of models.
E. Vehicle Body—Acknowledge if the preselected three letter body designator is correct or else, if not, enter the appropriate body style.
F. Special Equip.—Select "yes" or "no" for the options of Diesel, 4 wheel drive, and Turbo.
G. Odometer—Enter current odometer reading.
H. Dealer Invoice—Enter invoice if car is new. If the vehicle is used, skip this line.
I. Wholesale Book—Kelly's Wholesale Blue Book value must be entered for used car sales.
J. Vehicle Cost—Vehicle cost must also be entered.
K. Vehicle Identification No.—Manufacturer's 17 digit Vehicle Information Number.
L. Vehicle Transmission Type—e.g., manual or automatic In the absence of locating a vehicle because it doesn't exist in the database, a new record needs to be entered into the database. The record should include information for the above-identified fields.

Inputs and outputs of the Vehicle Information module 206, some of which are shown in FIG. 4, e.g., Sale Price, are used by other modules of the system 100.

B. Presume Term Module 214

The Presume Term module 214 automatically calculates the finance TERM 314 depending upon worst case finance program guidelines. For example, in the guidelines for one of the finance programs, if the vehicle's wholesale blue book value is $9300 (i.e., anywhere between $6,999.99–$9,999.99), the maximum term would be 36 months. The initial Term 314 is utilized by the Calculate First Pencil module 220. The Presume Term module 214 will be further described in conjunction with FIGS. 7a and 7b.

C. Presume Products Module 210

For the First Pencil, the Presume All Products module 210 presumes that the customer will purchase all products such as LA&H 320 (Life and Disability Insurance), IUI 322 (Involuntary Unemployment Insurance) and SERVICE CONTRACT 324. It calculates the premiums and costs (i.e., product costs to the dealer) and generates the Product Profits 326 which are utilized by the Calculate First Pencil module 220. The Presume All Products module 214 will be further described in conjunction with FIGS. 8*a* and 8*b*.

D. Presume Max Advance Module 208

The Presume Max Advance module 208 utilizes the output (310) of the Vehicle Information module 206 to determine the maximum advance percentage as previously described in the System Overview section. This advance percentage is then passed onto the Presume Down Payment module 212. The Presume Max Advance module 208 will be further described in conjunction with FIG. 9.

E. Presume Down Payment Module 212

After receiving the SALES PRICE 306, the Presume Down Payment module 208 automatically calculates the DOWN PAYMENT value 330 at the greater percent of selling price or fixed value depending upon the applicable finance program guideline (e.g., depending on the finance program guideline used, the down payment could be computed as 20% of selling price or $1500, whichever is greater). The Down Payment value 330 is utilized by the Calculate First Pencil module 220 (for worst case guideline only). The Presume Down Payment module 212 will be further described in conjunction with FIG. 10.

F. Calculate First Pencil Process 220

Once the SALES PRICE 306 has been entered and INITIAL TERM 314 has been determined, these figures automatically appear on the FIRST PENCIL (see FIG. 5). The First Pencil is indicative of a structure of the deal and includes the "Out the Door Price" (including Document Fees, Tax, License Fee, etc.), the annual percentage rate (APR) of the loan, the Life, Accident/Health (AH) & Involuntary Unemployment Insurance (IUI) Premiums and Total Amount Financed.

On the bottom of the FIRST PENCIL screen, as displayed on the visual display 154, the ADVANCE PERCENTAGE 342 is displayed as determined by the Presume Max Advance module 208. The Advance Percentage 342 varies from finance program to finance program.

A PROFITOMETER 344 is also displayed on the FIRST PENCIL screen. It consists of a string of letters and numbers. The letters represent various profit types and the numbers represent the subsequent profit values. A sample profitometer reading could be "g2485h0r0i1076s875t4436", which is defined as:

g2485 = Gross Profit (i.e., $2485.00 Gross Profit)

h0 = Holdback from Invoice—defined below (i.e., $0.00 Holdback)

r0 = Reserve which is the difference between Dealer Rate & Customer Rate—rates defined below (i.e., $0.00 Reserve)

i1076 = Insurance Profit (Life, A/H & IUI) (i.e., $1076.00 Insurance Profit)

s875 = Service Contract Profit (i.e., $875.00 Service Contract Profit)

t4436 = Total Dealer Profit (i.e., $4,436.00=$2485.00+ $0.00+$0.00+$1076.00+$875.00)

The gross profit is usually the difference between the selling price of the vehicle and the dealer's cost plus factory hold back and applicable incentives. The holdback is an amount held by the factory for each dealer for each vehicle purchased by the dealer and is paid to the dealership on a quarterly basis. The Dealer Rate is the interest rate the lender charges the dealer. The Customer Rate is the Annual Percentage Rate (APR) stated on the retail sales contract for the customer.

A First Pencil 4-Square 340 for the present deal can be displayed on the visual display 154 and/or printed on the printer 156 for use in further negotiations with the customer 104. The cash/trade equity value 348 is the down payment determined by the system 100 to be necessary for the deal. The customer 104 can use cash, a trade-in vehicle or a combination of cash and trade-in to satisfy the down payment requirement. The Calculate First Pencil Process 220 will be further described in conjunction with FIG. 11.

V. FIRST PENCIL MODULES

This section will further describe the Presume Term Module 214, the Presume Products Module 210, the Presume Max Advance Module 208, the Presume Down Payment Module 212 and the calculate First Pencil Process 200 by use of process flow diagrams. These flow diagrams are provided by FIGS. 7 through 11, respectively.

A. Presume Term Module 214

Figure 7B:
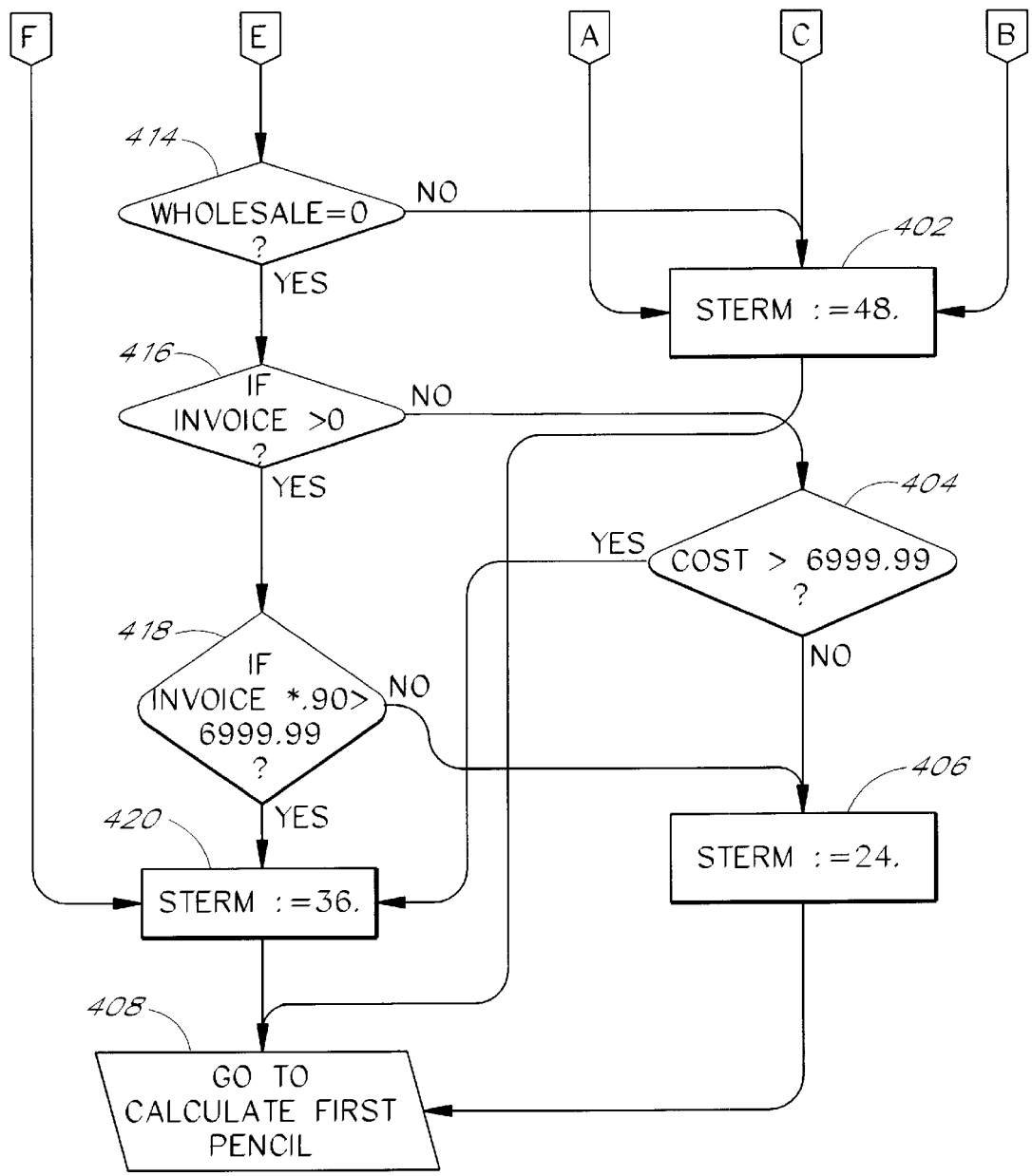

Referring now to FIGS. 7*a* and 7*b,* the Presume Term module 214 will now be further described. The Presume Term module 214 determines the initial loan term to be used by the system 100 in the determination of the first pencil. Beginning at a start state 390, the system 100 moves to a decision state 392 to determine if the vehicle 110 has been previously registered. If so, the system continues at a decision state 394 to determine if the Wholesale Book value is greater than $9999.99. The constant utilized in this module 214, along with modules 208, 212, 220 and 230 reflect a presently preferred worst case financial program. If so, the system 100 proceeds to state 402 on FIG. 7*b* wherein the initial term is set to be 48 months. If the wholesale value is determined to be less than $9999.99 at state 394, the system 100 moves to a decision state 396 to determine if the wholesale value is equivalent to zero (0). The wholesale value may be equal to zero if the value is not available or if the value is not required (e.g., when the car is new). If so, the system 100 advances to a decision state 398 to determine if the invoice is greater than zero, i.e., that an invoice amount for this vehicle has been entered into the system (e.g., if the vehicle is not registered). If the invoice is greater than zero, the system 100 moves to a decision state 400 to determine if 90% of the invoice value is greater than $9999.99. If so, the initial term is set to 48 months at state 402 on FIG. 7*b* and the system 100 then proceeds to state 408. The Presume Term module is finished at state 408 and then the system process goes to the Calculate First Pencil Process 220.

If decision state 392 determined that the vehicle 110 has not been registered, the system 100 advances to state 402 on FIG. 7*b* wherein the term is set to 48 months as previously described.

Several different paths lead to a decision state 412 as described herein. If the wholesale value is determined to be not equal to zero, as determined at state 396, the system proceeds to the decision state 412. If decision state 400 determines that 90% of the invoice value is less than or equal to $9999.99, the system 100 proceeds to a decision state 412. If the invoice, as determined at state 398, is not greater than zero, i.e., an invoice amount is not entered in the system for this vehicle, the system advances to a decision state 410 to determine if the cost is greater than $9999.99. Cost usually refers to used vehicles and is what the dealership paid for the vehicle plus any reconditioning and/or repairs necessary. If so, the system advances to state 402 on FIG. 7b wherein the term is set to 48 months as previously described. If the cost is not greater than $9999.99, as determined at state 410, the system 100 moves to decision state 412.

The wholesale value of the vehicle may determine the initial term as described herein. At decision state 412, the system 100 determines if the wholesale value is greater than $6999.99. If so, the system 100 proceeds to state 420 on FIG. 7b wherein the initial term is set to 36 months, and the system 100 then proceeds to state 408. If the wholesale value is determined to be less than or equal to $6999.99 at decision state 412, the system 100 moves to a decision state 414 on FIG. 7b. At decision state 414, the system determines if the wholesale value is equal to zero. If not, the system 100 proceeds to state 402 wherein the term is set to 48 months as previously described. If however, the wholesale value is equal to zero, as determined at state 414, the system 100 moves to a decision state 416 to determine if the invoice value is greater than zero.

The invoice value is used to determine the initial term as described herein. If the invoice is not greater than zero, as determined at decision state 416, the system 100 proceeds to a decision state 404. At decision state 404, the system 100 determines if the cost is greater than $6999.99. If so, the system 100 proceeds to state 420 wherein the initial term is set to 36 months. If the cost, as determined at state 404, is not greater than $6999.99, the system 100 proceeds to state 406 wherein the initial term is set to 24 months, and the system 100 then proceeds to state 408. If the invoice is greater than zero, as determined at decision state 416, the system 100 proceeds to a decision state 418. At decision state 418, the system 100 determines if 90% of the invoice value is greater than $6999.99. If so, the system 100 proceeds to state 420 wherein the initial term is set to 36 months. If 90% of the invoice is not greater than $6999.99, as determined at state 418, the system 100 proceeds to state 406 wherein the initial term is set to 24 months, as previously described.

At the completion of the Presume Term module 214, the initial term 314 (FIG. 4) is typically set to either 24 months, 36 months or 48 months depending upon the selected loan program.

As a note to the reader, the flow diagram corresponding to this module 214 is implemented with respect to a particular set of (worst case) guidelines. Other guidelines may change the specific implementation of the module. Also note that there is a direct relationship between a particular set of guidelines and a loan program.

B. Presume Products Module 210

Figure 8A:
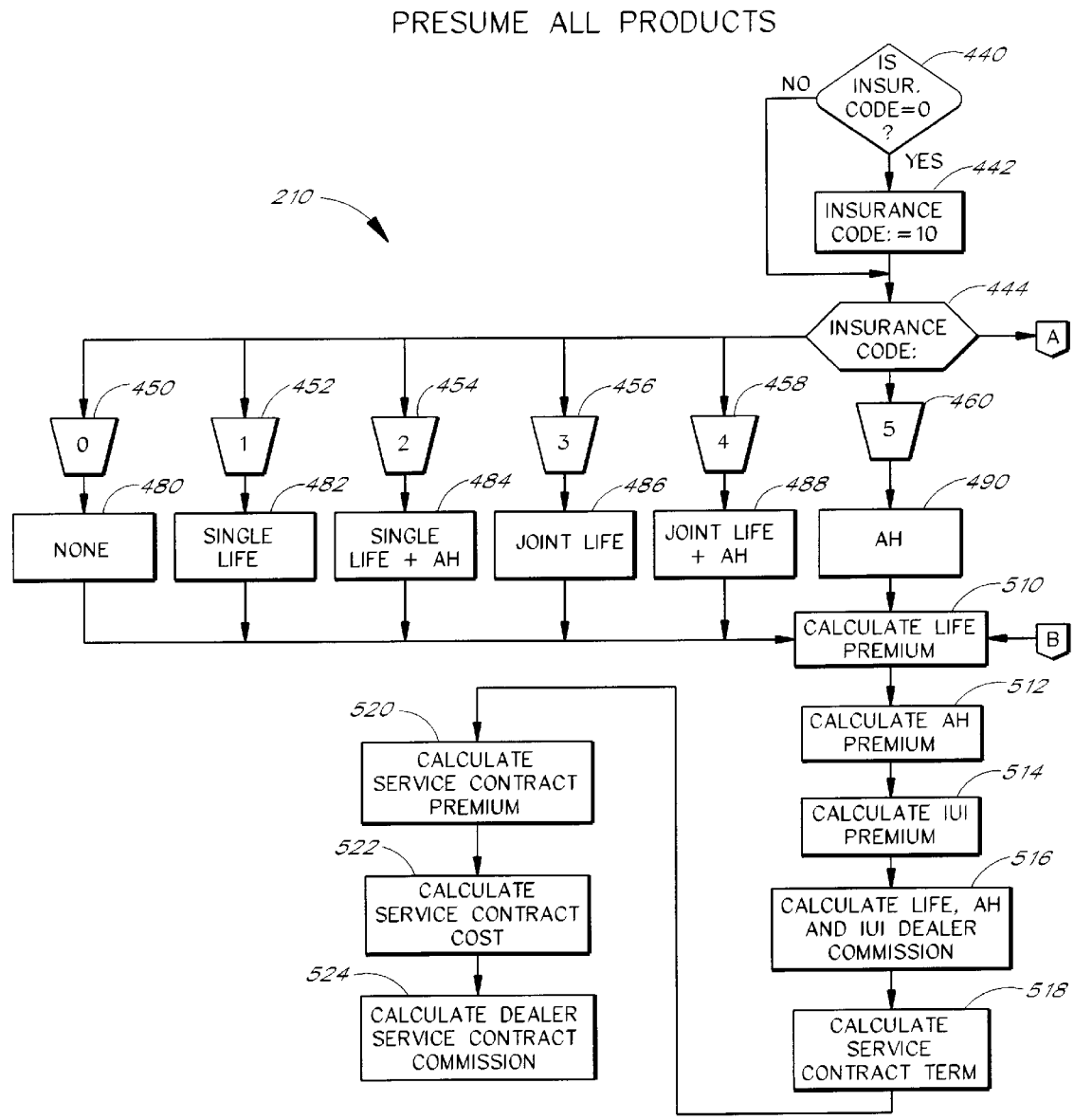
FIGS. 8a and 8b are a flow diagram of the Presume All Products module shown in FIGS. 3 and 4.
Figure 8B:
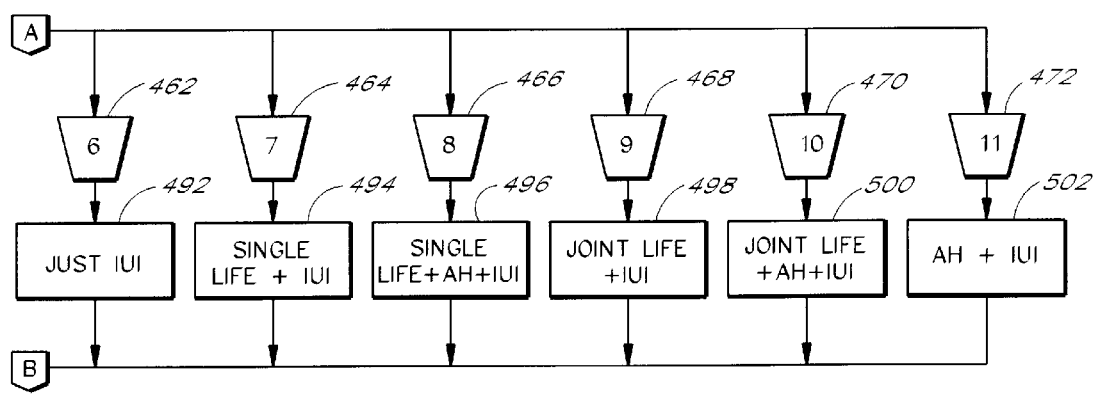

Referring now to FIGS. 8a and 8b, the Presume Products module 210 presumes the customer 104 will purchase the insurance policies and service contract that are offered and calculates the corresponding premiums and commissions.

For any "new" deal, the system 100 sets an insurance code to be equal to zero. At a decision state 440, module 210 determines if the insurance code is equal to zero to signify that this execution of the module is for purposes of the first pencil. If the code is zero, signifying first pencil, the system 100 moves to state 442 wherein the insurance code is set to ten (10) which represents all possible insurance products and a service contract. In subsequent deal negotiations, for example at the Structure Processing module 250 or the F&I Screen module 256, the desk manager 102 or F&I manager 106, respectively, enters the correct insurance code for the products agreed to by the customer 104. (At this subsequent time, a process flow similar to module 210 is executed, but without states 440 and 442). Certain conditions such as the age of the customer, the employment history during the last year and whether there is a co-buyer affect what insurance products are offered to the buyer. However, in the presently preferred embodiment of system 100, these conditions are not analyzed during the first pencil processing 300.

The product combinations are now presented. At state 444, the current insurance code is determined and a branch to one of the states 450 through 472 is performed based on the value of the insurance code (0 to 11 in the presently preferred embodiment). The insurance products corresponding to each insurance code are shown in states 480 through 502, which correspond to states 450 through 472, respectively. During first pencil processing 300, insurance code 10 corresponds with state 470 and state 500, wherein the products are joint life insurance, accident and health insurance, and involuntary unemployment insurance.

The calculations necessary to provide product profits are now presented. Module 210 continues at state 510 wherein the life insurance policy premium is calculated according to known insurance industry techniques (assuming a person whose age is less than 65 years, in the presently preferred embodiment). Moving to state 512, the system 100 calculates the accident and health policy premium (again, assuming a person whose age is less than 65 years in the presently preferred embodiment). Proceeding to state 514, the system calculates the involuntary unemployment policy premium (an assumption is made in the presently preferred embodiment that the buyer does not have more than a 29 day gap in employment during the last 12 months). Continuing at state 516, using the results of the calculations at states 510, 512 and 514, the dealer commissions for each of the respective policies are determined. Advancing to states 518, 520, 522 and 524, the system 100 determines the service contract term, premium, cost and commission, respectively, for the selected vehicle 110 based on the make, model, and year and mileage (if a used vehicle) of the vehicle 110. At the completion of module 210, the premiums and commissions or product profits 326 (FIG. 4) for the financed products are determined.

C. Presume Max Advance Module 208

Figure 9:
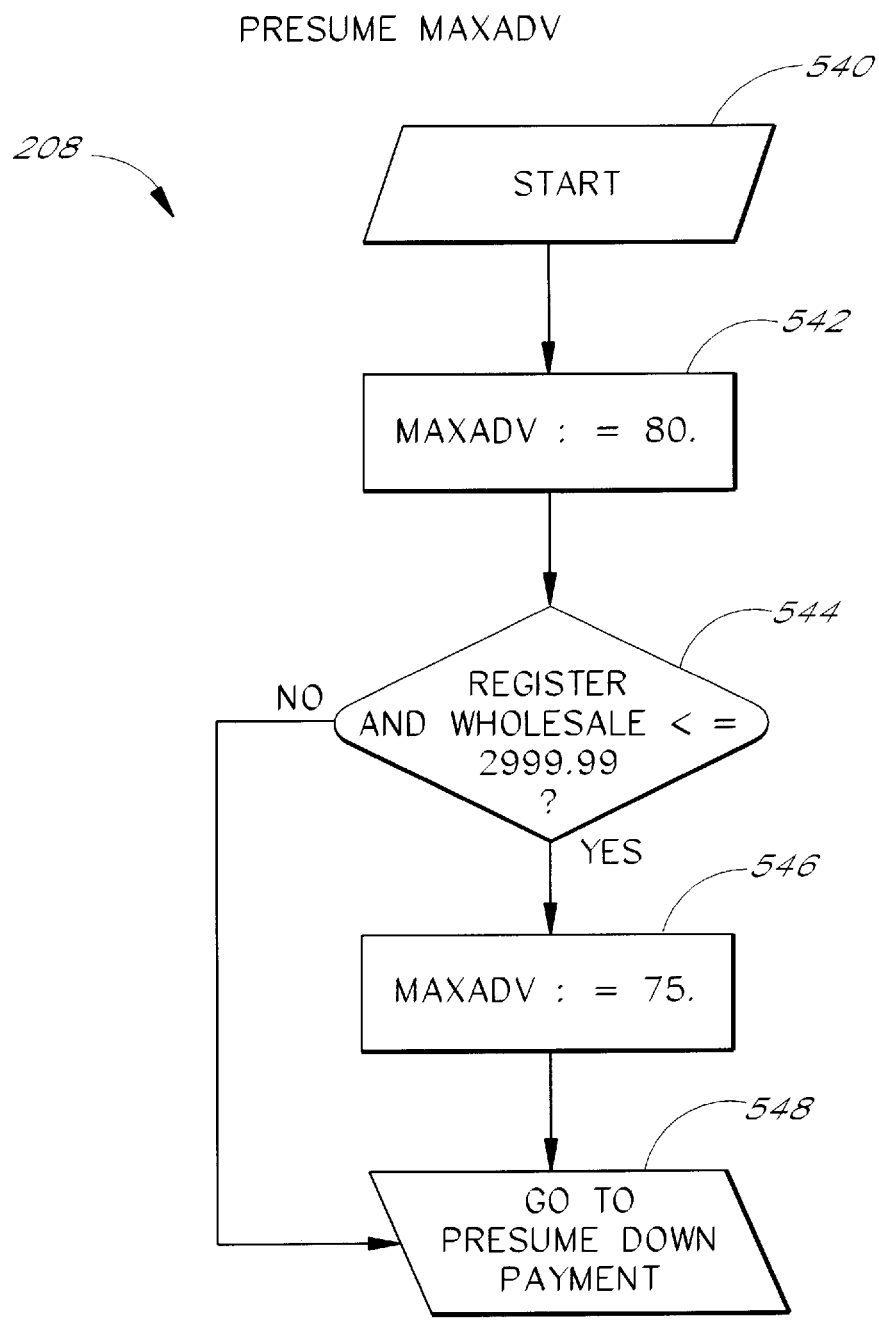
FIG. 9 is a flow diagram of the Presume Max Advance module shown in FIGS. 3 and 4.

The Presume Max Advance module 208 utilizes the output of the Vehicle Information module 206 to determine a maximum advance percentage of the invoice price (new vehicle) or Wholesale Book value (used vehicle). Referring now to FIG. 9, the Presume Max Advance module 208 begins at a start state 540 and continues at state 542 wherein the maximum advance percentage for first pencil processing 300 is set to be 80%. Proceeding to a decision state 544, the system 100 determines if the vehicle is registered, and if so, whether the wholesale value of the vehicle is less than or equal to $2999.99. If the wholesale value is less than or equal to $2999.99, the system 100 moves to state 546 wherein the maximum advance percentage is set to be 75%. Of course, in other embodiments of the system 100, other advance percentage values or other criteria to determine the advance percentage may be utilized. If the wholesale value is greater than $2999.99, as determined at state 544, or at the completion of state 546, the system proceeds to state 548 to finish the module 208 and then proceeds to the Presume Down Payment module 212.

As a note to the reader, the flow diagram corresponding to this module 208 is implemented with respect to a particular set of (worst case) guidelines. Other guidelines may change the specific implementation of the module.

D. Presume Down Payment Module 212

Figure 10A:
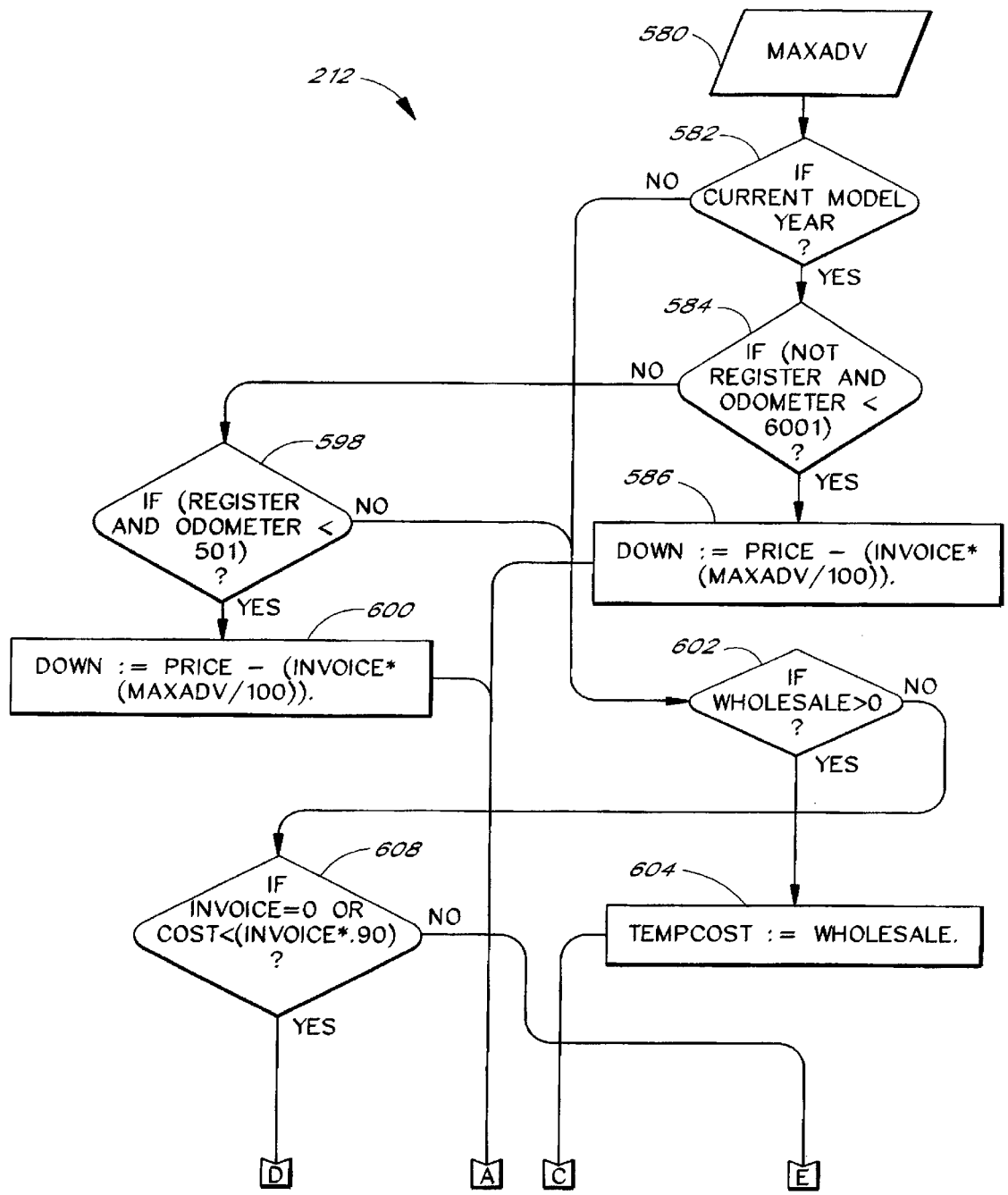
FIGS. 10a and 10b are a flow diagram of the Presume Down Payment module shown in FIGS. 3 and 4.
Figure 10B:
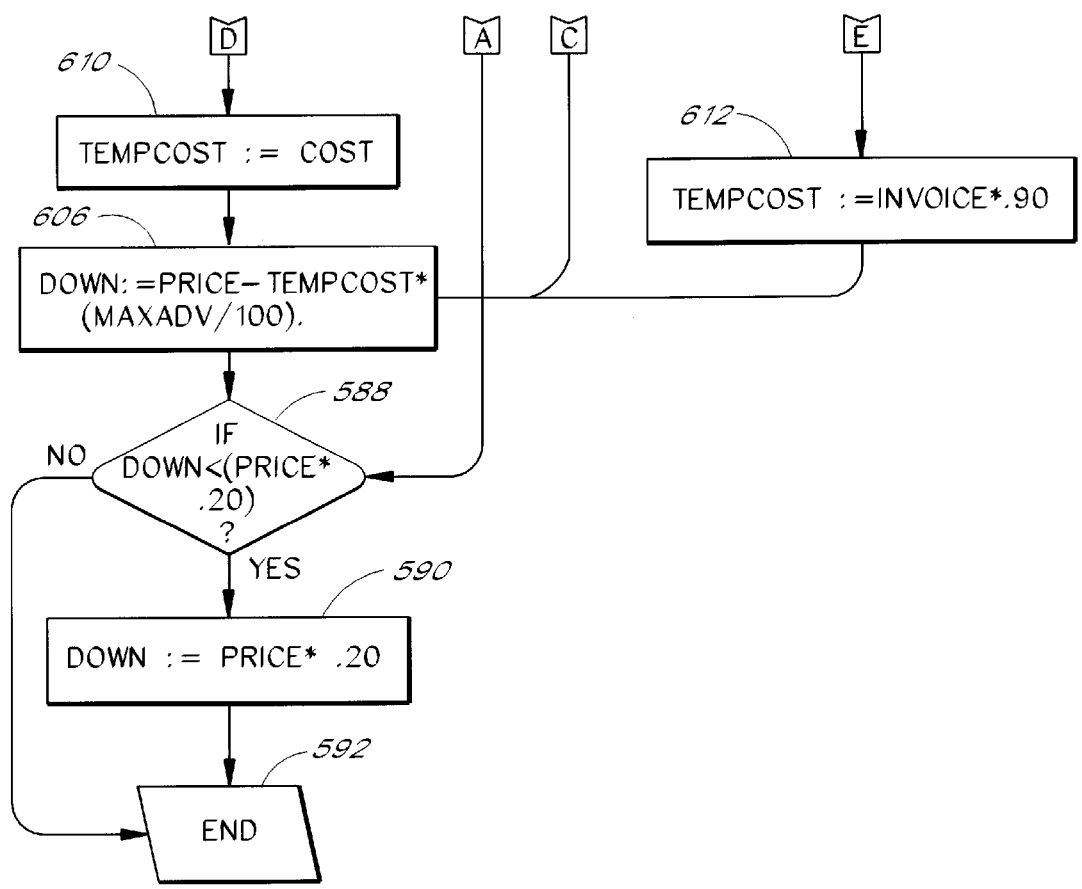

The Presume Down Payment module 212 determines the worst-case down payment based on information from the Vehicle Information module 206 and Presume Max Advance module 208. Referring now to FIGS. 10a and 10b, the Presume Down Payment module 212 begins at a state 580 wherein the maximum advance percentage determined by module 208 (FIG. 9) is accessed. Proceeding to a decision state 582, the system 100 determines if the model year of the desired vehicle 110 corresponds with the current model year. If so, the vehicle could be considered a new vehicle and the system 100 advances to a decision state 584 for further determination. At state 584, the system 100 determines if the vehicle 110 has not been registered and the odometer mileage is less than 6001 miles. If so, the vehicle is considered new and the system 100 moves to state 586 wherein the down payment is determined to be the selling price minus the product of the invoice and the maximum advance percentage. Moving to a decision state 588 on FIG. 10b, the system 100 determines if the down payment value is less than 20 percent of the selling price. If so, the system 100 sets a minimum down payment of 20 percent of the selling price at state 590. The Presume Down Payment module 212 finishes at an end state 592. If the down payment value is greater than or equal to 20 percent of the selling price, as determined at state 588, the minimum down payment criteria is met and the system 100 proceeds to the end state 592.

Returning to decision state 584 on FIG. 10a, if the vehicle has been registered or the odometer mileage is greater than or equal to 6001 miles, the system 100 continues at a decision state 598. At decision state 598, the system 100 determines if the vehicle is registered and the odometer mileage is less than 501 miles. If so, the system 100 proceeds to state 600 wherein the down payment is determined to be the selling price minus the product of the invoice and the maximum advance percentage. Moving to the decision state 588, the system 100 determines if the down payment value is less than 20 percent of the selling price, as previously described. If at decision state 598 evaluates to be false, the system 100 moves to a decision state 602 wherein a determination is made whether the wholesale value for this vehicle is greater than zero, i.e., that a wholesale value is known and entered into the system 100. If the wholesale value is greater than zero, the system 100 proceeds to state 604 wherein a variable "tempcost" is set to the wholesale value. Continuing at state 606 on FIG. 10b, the system 100 determines the down payment to be the selling price minus the product of "tempcost" and the maximum advance percentage.

The variable "tempcost" represents one of either the wholesale value (state 604), the value of cost (state 610), or 90 percent of the invoice value (state 612), depending on the particular vehicle, as implemented by this module 212. Historically, a loan is based on what the vehicle "costs", i.e., the "tempcost", to the dealership and not on the selling price of the vehicle. The difference (state 606) between the vehicle selling price and what the vehicle "costs" the dealership multiplied by the worst case advance percentage (the product being the worst case loan value) is the amount that the buyer must provide either by cash or trade equity, i.e., the down payment of the worst case loan value plus additional dealer markup. The worst case advance percentage is determined by module 208. Thus, if the selling price is high compared to the "cost" of the vehicle, the buyer must provide a higher down payment than if the selling price is closer to the "cost".

Moving to the decision state 588, the system 100 determines if the down payment value is less than 20 percent of the selling price, as previously described.

Returning to decision state 602 on FIG. 10a, if the wholesale value equals zero, the system 100 proceeds to a decision state 608 to determine if the invoice value is equal to zero, i.e., the invoice is not known or has not been entered into the system, or if the invoice is greater than zero, whether the cost is less than 90 percent of the invoice amount. If decision state 608 evaluates to be true, the system 100 continues at state 610 on FIG. 10b wherein the variable "tempcost" is set to the value of cost. Continuing at state 606, the system 100 determines the down payment to be the selling price minus the product of "tempcost" and the maximum advance percentage, as previously described. If decision state 608 evaluates to be false, the system 100 continues at state 612 on FIG. 10b wherein the variable "tempcost" is set to 90 percent of the invoice value. Continuing at state 606, the system 100 determines the down payment to be the selling price minus the product of "tempcost" and the maximum advance percentage, as previously described.

The prior states described the current model year flow. Next the process flow for a vehicle not of the current model will be described. Returning to decision state 582 on FIG. 10a, if the model year of the vehicle 110 is not the current model year, the system 100 proceeds to decision state 602 to determine if the wholesale value of the vehicle is greater than zero, as previously described. If the wholesale value is greater than zero, the system proceeds to state 604 wherein "tempcost" is set equal to the wholesale value, as previously described. If the wholesale value is equal to zero at decision state 602, processing continues at decision state 608 to determine if "tempcost" will be determined by the cost or by 90 percent of the invoice, as previously determined.

At the conclusion of the Presume Down Payment module 212, a down payment value 330 (FIG. 4) for first pencil processing 300 is determined.

As a note to the reader, the flow diagram corresponding to this module 212 is implemented with respect to a particular set of (worst case) guidelines. Other guidelines may change the specific implementation of the module.

E. Calculate First Pencil Process 220

Figure 11A:
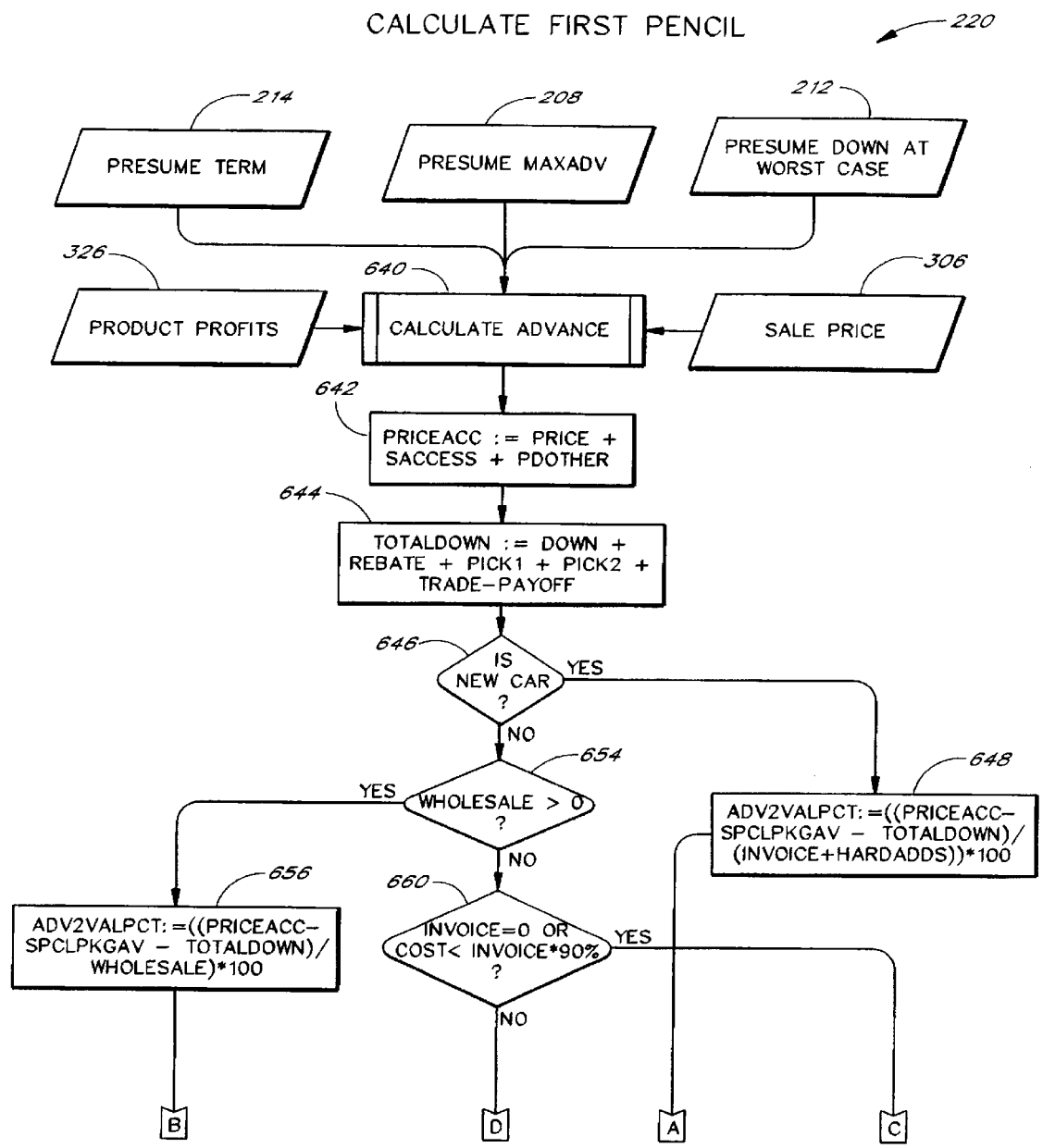
FIGS. 11a and 11b are a flow diagram of the Calculate First Pencil module shown in FIGS. 3 and 4.
Figure 11B:
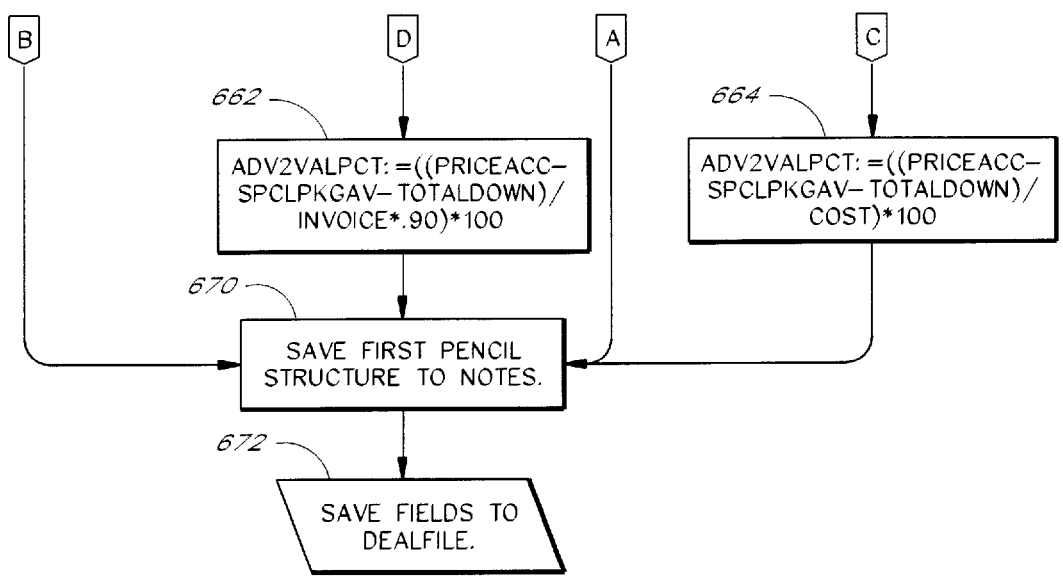

Referring now to FIGS. 11a and 11b, the Calculate First Pencil Process 220 will be described. The output of the Presume Term module 214, the Presume Max Advance module 208, the Presume Down at Worst Case module 212, the sales price 306 and the product profits 326 all provide the inputs to a Calculate Advance function 640. States 642 through 664 can be considered as the presently preferred embodiment of the function 640. The Presume Max Advance module 208 provides the maximum possible advance percentage, but module 220 determines the actual advance percentage for this deal.

After Calculate Advance (at state 642), a variable "price-acc" is determined to be the sum of the selling price plus a total of the vehicle accessory prices (saccess) plus a total of "paid to other" items (pdother). "Paid to other" includes non-taxable fees. The saccess value is available to the Calculate First Pencil Process 220 from the Vehicle Inventory 130 through the Vehicle Information module 206.

Moving to state 644, the system 100 determines the value of a variable "totaldown" as the sum of the down payment from the Presume Down module 212, any manufacturer's rebate available for this vehicle 110, any pick payment(s) (pick1, pick2), and a trade-in value minus the payoff value for the trade-in. A pick payment is a deferred down payment made after the vehicle is delivered to the customer and entails a possible element of risk of non-payment. A dealership may agree to one or more pick payments to consummate a deal. A trade-in is not entered into the "totaldown" calculation during first pencil processing 300, but is utilized in processing of subsequent pencils during the Structure Processing module 250.

Continuing at a decision state 646, the system determines if the vehicle is considered a new vehicle according to the loan program guidelines (utilizing factors such as registration, mileage, and model year). If so, the system 100 moves to state 648 to determine the value of a variable "adv2valpct" (advance to value percentage), which is illustrated in the example first pencil screen display of FIG. 5 as reference number 342. Based on the value of "adv2valpct" and the other inputs to the module 220, the remainder of the items on first pencil screen (FIG. 5) can be determined. "Adv2valpct" is defined by the equation: "adv2valpct"=(("priceacc"−"spclpkgav"−"totaldown")/(invoice+"hardadds"))×100. "Spclpkgav" is an over advance amount for a special package, i.e., an amount that can be added over the maximum allowable advance for a package of add-ons such as an Invisigraphics package. "Hardadds" is the value of accessories or after-market items allowable for financing. These items are generally listed in the Kelly Wholesale Blue Book or NADA Black Book or other recognized sources of wholesale values.

The final states of the Calculate First Pencil Process 220 will now be described. At the completion of state 648, the system 100 advances to state 670 on FIG. 11b wherein the first pencil structure is saved to the Notes file 222. The structure can be considered a "snapshot" of the first pencil screen, an example of which is shown in FIG. 5. As a note to the reader, state 670 is not performed during the second or subsequent pencils during Structure Processing 250 (for the same vehicle and customer). Moving to state 672, information from the inputs to module 220 is saved in fields in the Deal file 224. As a note to the reader, any new information entered during subsequent processing of the system 100 overwrites the corresponding field of the Deal file 224 for the same customer and vehicle. A deal can be recalled at a later time by use of the information stored in the Notes file 222 and Deal file 224. The Notes file 222 and Deal file 224 are used as inputs in processing of subsequent pencils during the Structure Processing module 250. The Calculate First Pencil Process 220 includes additional steps, such as generating the profitometer 344 and the 4-square display 340, which are not shown in FIG. 11b. Additional steps may be seen in the source code listing provided in the attached Microfiche Appendix.

The prior description for the Calculate First Pencil Process 200 was for a new vehicle. A description for a used vehicle follows. Returning to decision state 646 on FIG. 11a, if the system 100 determines that the vehicle 110 is not a new vehicle, processing moves to a decision state 654 to determine if the wholesale value is greater than zero, i.e., a wholesale value is known for the vehicle 110 and is entered in the system 100. If so, the system 100 proceeds to state 656 wherein "adv2valpct" is defined by the equation: "adv2valpct"=(("priceacc"−"spclpkgav"−"totaldown")/wholesale)×100. This state 656 is similar to state 648 except that the Wholesale Book value of the vehicle 110 is used in state 656 instead of the sum of the invoice and "hardadds".

At the completion of state 656, the system 100 advances to state 670 on FIG. 11b wherein the first pencil structure is saved to the Notes file 222, as previously described.

Next, a description of the flow state for the case when the wholesale value is not known or entered follows. Returning to decision state 654 on FIG. 11a, if the wholesale value is determined to be zero, the system 100 moves to a decision state 660 to determine if the invoice value is equal to zero or, if the invoice value is greater than zero, i.e., is known and is entered into the system 100, whether the cost of the vehicle is less than 90 percent of the invoice value. If the decision state 660 evaluates to be false, the system 100 proceeds to state 662 on FIG. 11b wherein "adv2valpct" is defined by the equation: "adv2valpct"=(("priceacc"−"spclpkgav"−"totaldown")/invoice×0.90)×100. This state 662 is similar to state 648 except that the 90 percent of the invoice value of the vehicle 110 is used in state 662 instead of the sum of the invoice and "hardadds". At the completion of state 662, the system 100 advances to state 670 wherein the first pencil structure is saved to the Notes file 222, as previously described.

Returning to decision state 660 on FIG. 11a, if state 660 evaluates to be true, the system 100 proceeds to state 664 on FIG. 11b wherein "adv2valpct" is defined by the equation: "adv2valpct"=(("priceacc"−"spclpkgav"−"totaldown")/cost)×100. This state 664 is similar to state 648 except that the cost of the vehicle 110 is used in state 664 instead of the sum of the invoice and "hardadds". At the completion of state 664, the system 100 advances to state 670 wherein the first pencil structure is saved to the Notes file 222, as previously described.

The field names and field descriptions for the Deal file 224 and Notes file 222 are listed in the attached Microfiche Appendix.

As a note to the reader, the flow diagram corresponding to this module 220 is implemented with respect to a particular set of (worst case) guidelines. Other guidelines may change the specific implementation of the module.

VI. FINANCIAL SOURCE FILTER

Dealerships in the past have not been able to predict with certainty whether a particular customer qualifies for financing. One of the main problems is that finance sources will not provide written documentation on what parameters and values they are looking for to determine the acceptance of a particular loan. The Financial Source Filter module 230 utilizes expert system technology to enable a dealership to match a customer to a particular loan program and virtually guarantee that the finance source associated with that loan program will approve the loan. This enables the dealership to make sales in the evening or on weekends when finance sources are closed. Thus the sales team can close the deal on the spot and make delivery while the customer is at the dealership.

A. Financial Source Filter Overview

Referring to FIG. 12, an overview 700 of the Finance Source Filter (FSF) 230 will be described. The customer initiates FSF activity by completing a credit application 112. The credit application 112 is an important tool in the sales process. It is also an important legal document that should be completely and accurately answered and signed by the customer 104. By completing the credit application 112 in full detail, the desk manager 102 may be able to save a deal that would otherwise be declined by the lender 108. The lender 108 may also refuse a deal if the credit application 112 is incomplete, but could have been approved if the information was supplied. A fully completed credit application 112 supplies the desk manager 102 with the budget and credit information 114 needed to structure the deal correctly the first time.

Based on the customer identification 135, e.g., full name, address and social security number, obtained from the credit application, the desk manager 102 can initiate the retrieval of one or more credit bureau reports. Credit bureaus 134 are the most important tools that the dealership has to determine identification, legitimacy, past credit history and public records of the customer 104. This information is necessary before a deal can be accurately structured or a credit decision can be made. For example, there are three major credit bureaus 134 that service California: TRW, Trans Union and Equifax also known as CBI (Credit Bureau Information). There is also a merging service called "Credco" which puts all the information from two or three credit bureaus into a single merged credit detail or report 708. This single report is fully merged, de-duped by trade line, easy to read, printed in plain language and easy to use. Merged credit reports 708 eliminate the human error of interpretations and make it easier to identify duplicate information. Dealers using the system 100 are required to pull either two pre-assigned credit bureaus based on residence of buyer (such as TRW and CBI) or one merged Credco report with TRW and CBI bureaus combined for each customer. It is important to have a complete credit application 112 signed by the buyer 104 and co-buyer if applicable, before a credit report can be pulled.

If the dealership is not signed up with Credco and has to pull two bureaus and merge them manually, a consistent, organized procedure 706 is used and followed each time interpretations of the bureaus 134 are made.

A credit score and other credit information 136 about the customer 104 (available from the merged credit detail 708) is used by the FSF 230. The FSF 230 has access to a set of loan guidelines for a plurality of loan programs or loan program tiers shown as Loan Program A 710 through Loan Program N 718, with Loan Program A 710 corresponding to a customer with an excellent credit rating. The presently preferred embodiment utilizes five loan programs A, B, C, D, E. An additional Exception Application program 720 for unusual circumstances requires approval from the lender 108 before the loan can be accepted.

In operation, the FSF 230 selects a credit question from the CredQues database 236 (path 730). The question about the customer's credit is displayed on the computer to the customer 104. Using information from the desk manager 102 (path 732) merged credit detail 708 and the completed credit application 112 (FIG. 1), the desk manager 102 provides a credit answer to the FSF 230 (path 734). The credit answers are saved to a set of records for the current customer 104 in the CredAns database 238. Based on a series of selected questions 730 and answers 734, the FSF 230 determines a rate level that corresponds to the loan program 740 from the plurality of available loan programs 710–720 most indicative of the customer's credit worthiness. The selected loan program 740 is utilized in further processing of the deal in the Structure Processing module 250.

B. Financial Source Filter Process 230

Referring to FIGS. 13a, 13b, 13c, 13d and 13e and also FIG. 12, the Financial Source Filter (FSF) process 230 will be described. The FSF 230 begins at a start state 760 on FIG. 13a and proceeds at a state 762 wherein vehicle information previously collected during the Vehicle Information module 206 is accessed by the FSF module 230. Additional information about the vehicle 110 can be entered on a vehicle information screen by, for example, selecting the F2 key. Continuing to a Customer Budget state 764 and a Customer Information state 766, additional information about the customer and his/her current budget status is requested by the system, such as the buyer's/co-buyer's full names, buyer's/co-buyer's gross monthly income, rent/house payment and so forth. Additional information about the buyer or co-buyer can be entered or changed on a Customer Information screen by selecting the F4 key. Additional information about the buyer's or co-buyer's budget can be entered or changed on a Customer Budget screen by selecting the F3 key. As previously mentioned, the desk manager 102 uses the credit application and/or the merged credit detail 708 as the basis of this information. The Customer Information screen and the Customer Budget screen must be completed before continuing on with the remainder of the FSF process 230. If some information is not entered, the system prompts the desk manager for the specific piece of information at the time the specific information is needed by the system 100.

At the completion of state 766, the system 100 moves to state 768 and opens the CredQues database 236 and the CredAns database 238. Moving to state 770, a FSF pointer is set to index a series of credit questions in the CredQues database 236 at the highest rate level (ratelevel = zero). These questions establish some general information about the customer 104 before the customer is placed at a ratelevel based on his/her credit score. The answers to the credit questions are stored in the CredAns database 238. Moving to a decision state 772, the system 100 solicits the credit score for the customer 104 available from the merged credit detail 708. As previously mentioned, several different credit bureaus 134 may be utilized in retrieving the credit reports. One of these credit bureaus is TRW. The following states 780 through 796 utilize the credit scoring system used by TRW. Other credit bureaus may use similar scoring systems. Depending on the credit score from state 772, the system 100 branches to state 780 (on FIG. 13b) if the bureau score is less than 640, wherein the rate level is set to loan program D at state 790; to state 782 if the bureau score is less than 680 and greater than or equal to 640, wherein the rate level is set to loan program C at state 792; to state 784 if the bureau score is less than 730 and greater than or equal to 680, wherein the rate level is set to loan program B at state 794; and to state 786 (on FIG. 13c) if the bureau score is greater than or equal to 730, wherein the rate level is set to loan program A at state 796.

Figure 13B:
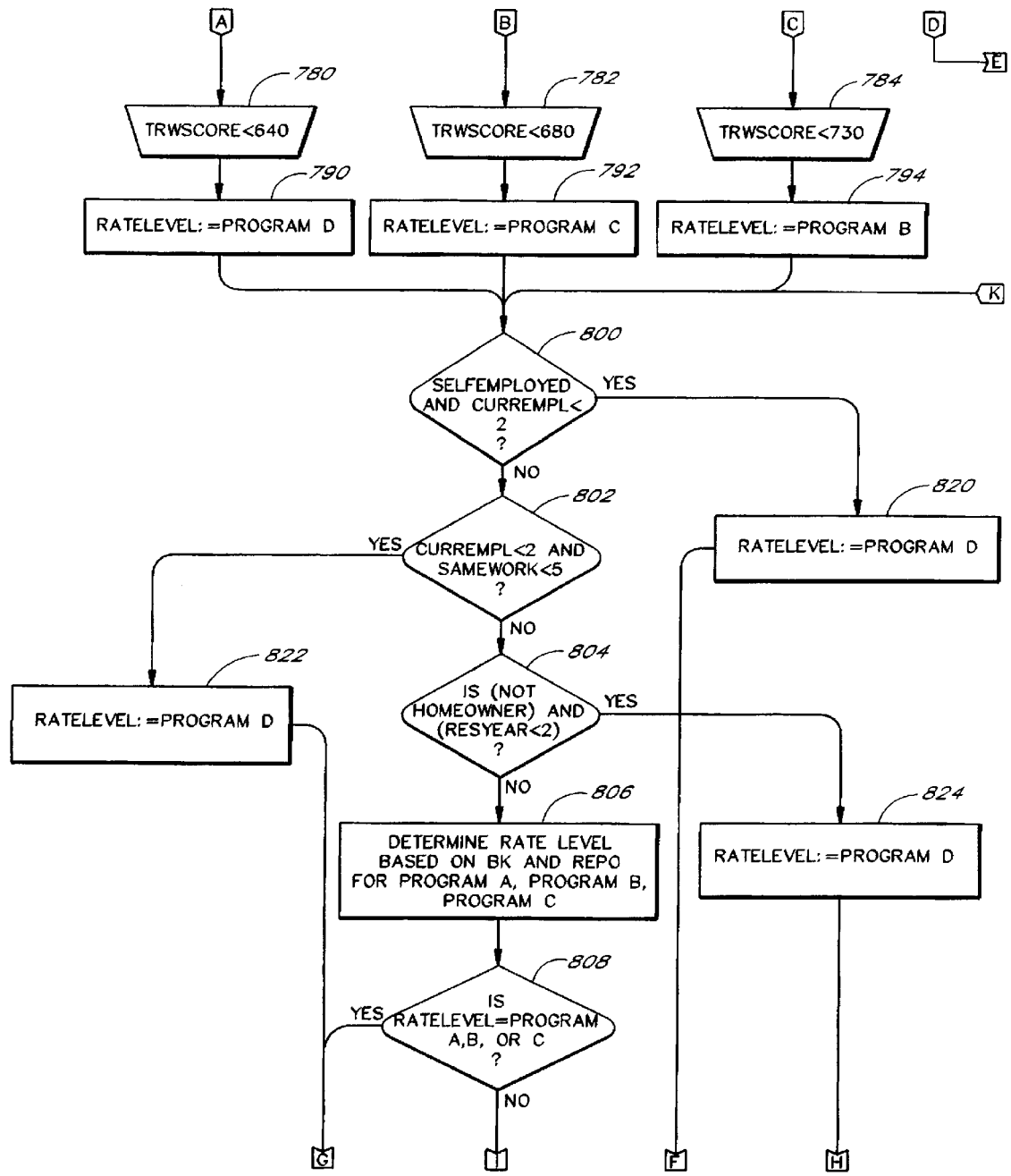
Figure 13C:
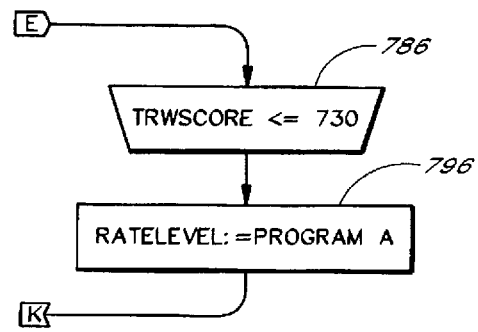

At the completion of any of states 790, 792, 794 or 796, the system 100 advances to a decision state 800 (on FIG. 13b). A set of decision states 800–804 is used to determine if the initial rate level set during states 772–796 should be adjusted based on several employment and residency questions. The information utilized at states 800–804 has been previously entered into the system 100 during the Customer Information state 766. At decision state 800, the system 100 determines if the buyer 104 is self-employed and the current employment is for a period of less than two years. If so, the rate level is adjusted to correspond to loan program D at state 820. If decision state 800 evaluates to be false, the system 100 proceeds to decision state 802 to determine if the employment period of the buyer 104 with his/her current employer is for less than 2 years and whether the line of work in which the buyer 104 is employed in is less than five years. If so, the rate level is adjusted to correspond to loan program D at state 822. If decision state 802 evaluates to be false, the system 100 proceeds to decision state 804 to determine if (1) the buyer is not a homeowner and (2) if his years of residence in California is less than two. If so, the rate level is adjusted to correspond to loan program D at state 824. If decision state 804 evaluates to be false, the system 100 proceeds to state 806.

At state 806, the system 100 makes an adjustment to the rate level, if necessary, based on bankruptcy or repossession factors of the buyer 104, if the current rate level is either of Loan Program A, B or C (see Table 1). The steps to adjust the ratelevel because of bankruptcy or repossession factors are listed in the attached Microfiche Appendix. After any adjustment of the rate level due to bankruptcy or repossession factors at state 806, the system 100 moves to a decision state 808 and determines if the current rate level corresponds to either of Loan Programs A, B or C. From an affirmative response to the inquiry of state 808, or at the completion of either of the states 820, 822 or 824, the system 100 continues at a state 810 on FIG. 13d. At state 810, the FSF pointer into the CredQues database 236 is set to the beginning of the credit questions for the current rate level.

Figure 13D:
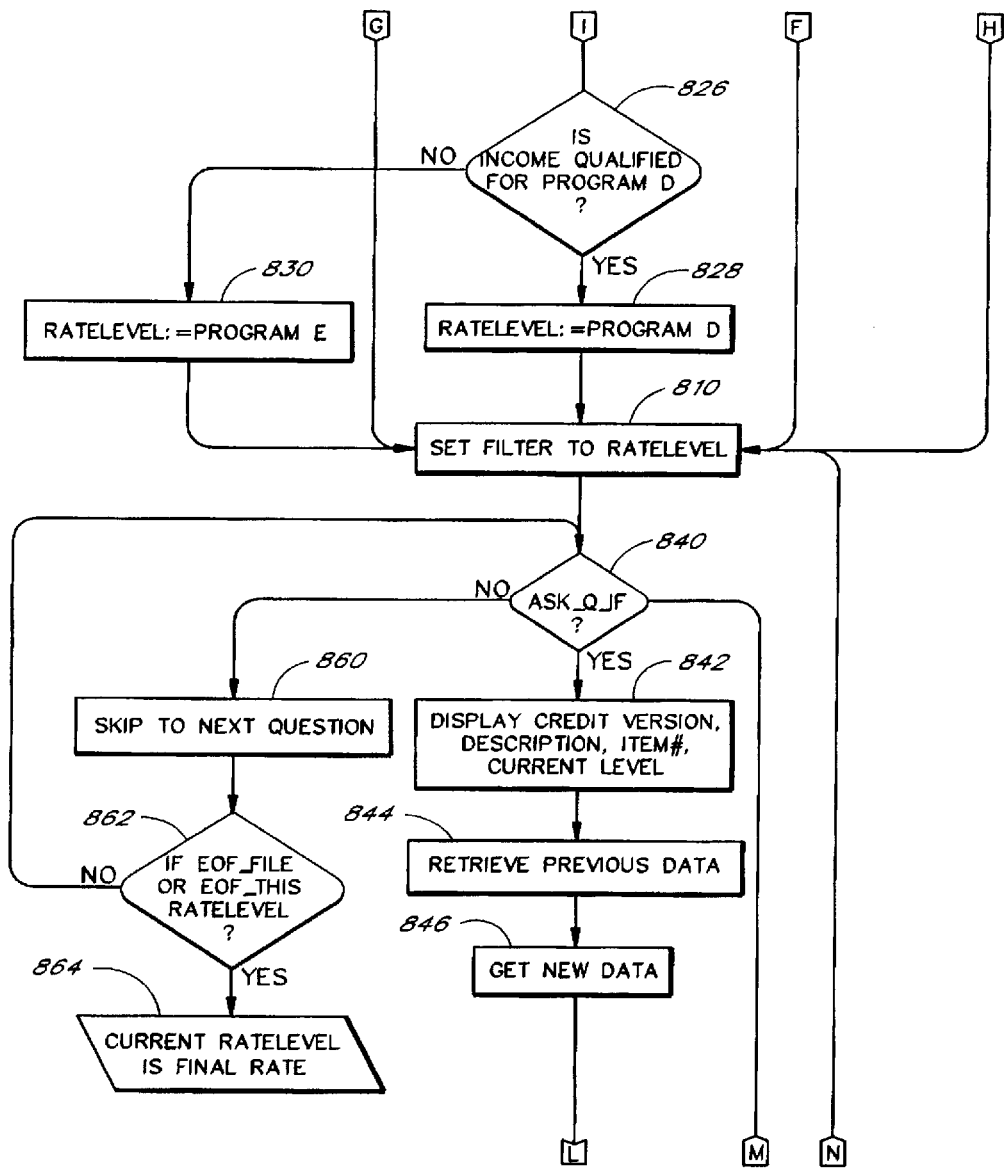

Returning to the decision state 808 on FIG. 13b, if the current rate level does not correspond to either of Loan Programs A, B or C, the system 100 proceeds to a decision state 826 on FIG. 13d. At decision state 826, the system 100 determines if the current income level of the buyer 104 qualifies the buyer for Loan Program D. In the presently preferred embodiment of the system 100, the minimum income level used at state 826 is $1800 gross per month. Of course, in other situations, such as a different state in the country, a different lender or at a time in the future, the income level may be adjusted. If the decision state 826 evaluates to be true, the system 100 moves to state 828 wherein the rate level is set to correspond with Loan Program D. If the decision state 826 evaluates to be false, the system 100 moves to state 830 wherein the rate level is set to correspond with Loan Program E. At the completion of either of the states 828 or 830, the system 100 continues at state 810, as previously described.

At the completion of state 810 on FIG. 13d, the system 100 evaluates the condition "ASK_Q_IF" for the current credit question at the current rate level in the CredQues database 236. A example condition is to ask the credit question if the buyer is in the military, but to skip the question if the buyer is not in the military. The corresponding credit question at rate level 70 is "Enter military pay grade". The system uses information entered at states 764 and 766 and from answers to previous questions to evaluate the ASK_Q_IFs. If the condition "ASK_Q_IF" for the current credit question evaluates to be true at decision state 840, the system 100 moves to state 842 and displays a credit version number for the current loan program, a description of the credit question, the item (credit question) number within the current rate level, and the current rate level. These items are displayed on the visual display 154 (FIG. 1) as an aid to the desk manager 102 to keep track of progress through the credit questions. At the completion of state 842, the system 100 moves to state 844 and retrieves data previously stored in the CredAns database 238 that is pertinent to the current credit question. Advancing to state 846, the system 100 directs the desk manager 102 to enter new data about the buyer 104 into the computer 140 that is necessary to answer the current credit question. Note that if the FSF process 230 is re-entered and the same questions are asked, the system 100 defaults to the previous answer for that question. Proceeding to a decision state 848 on FIG. 13e, the system 200 determines if a conditional expression "IF_COND" for the current credit question is true. For example (at rate level 60), for the credit question "Previous High Credit Amount?", the IF_COND is "prevhicred > 1499.99". If the "IF_COND" evaluates to be true, at decision state 848, the system 100 proceeds to state 850 wherein an adjustment of the advance percentage may be made, if applicable to this question. Moving to state 852, the system 100 advances to the next question in the CredQues database 236 at the current rate level and then loops back to decision state 840 on FIG. 13d to begin processing the next question. As another example of a credit question, rate level 10 includes: "Prior high installment credit amount?".

Figure 13E:
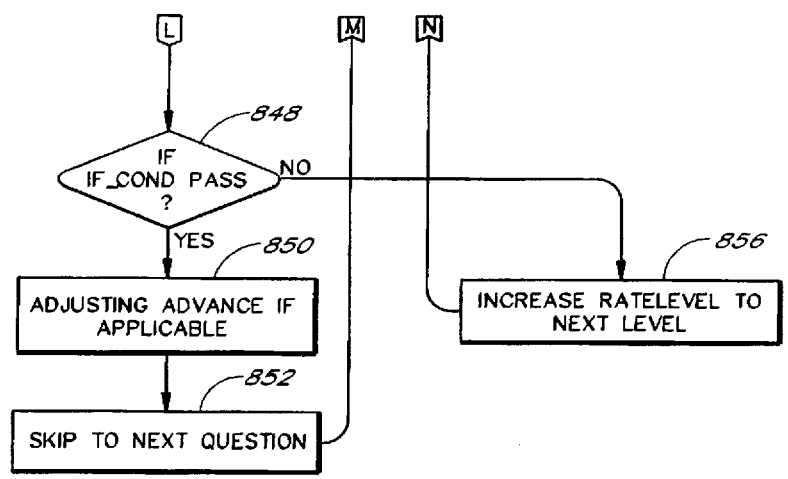

Returning to decision state 848 on FIG. 13e, if the "IF_COND" evaluates to be false, the system 100 proceeds to state 856 wherein the rate level is changed to the next higher rate level/number, e.g., from rate level 20, corresponding to Loan Program B, to rate level 30, corresponding to Loan Program C. For some credit questions, if the "IF_COND" evaluates to be false, the rate level may be changed by more than one level. An example of such a question is "60-day delinquency in the last 12 months?" at rate level 20. At the completion of state 856, the system 100 loops back to state 810 on FIG. 13d to begin processing the first credit question at the beginning of the new rate level.

Returning to decision state 840 on FIG. 13d, if the condition "ASK_Q₁₃ IF" for the current credit question evaluates to be false, the system 100 moves to state 860. State 860 directs the system 100 to skip the current credit question and access the next question because the condition "ASK_Q_IF" for the current question is false. Moving to a decision state 862, the system 100 determines if the end of the CredQues database 236 or the end of the current rate level (no further credit questions at this rate level) has been reached. If not, the system 100 loops back to decision state 840 to process the next credit question. However, if the end of the CredQues database 236 or the end of the current rate level has been reached, as determined at decision state 862, the system 100 completes the FSF process 230 at state 864 wherein the current rate level is considered to be the final rate level. Thus, the loan program corresponding to the final rate level is identified for use in further processing by the system 100.

The field names and field descriptions for the CredQues database 236 and CredAns database 238 are listed in the attached Microfiche Appendix.

As a note to the reader, the flow diagram corresponding to this module 230 is implemented with respect to a particular set of (worst case) guidelines. Other guidelines may change the specific implementation of the module.

VII. CONCLUSION

Figure 14:
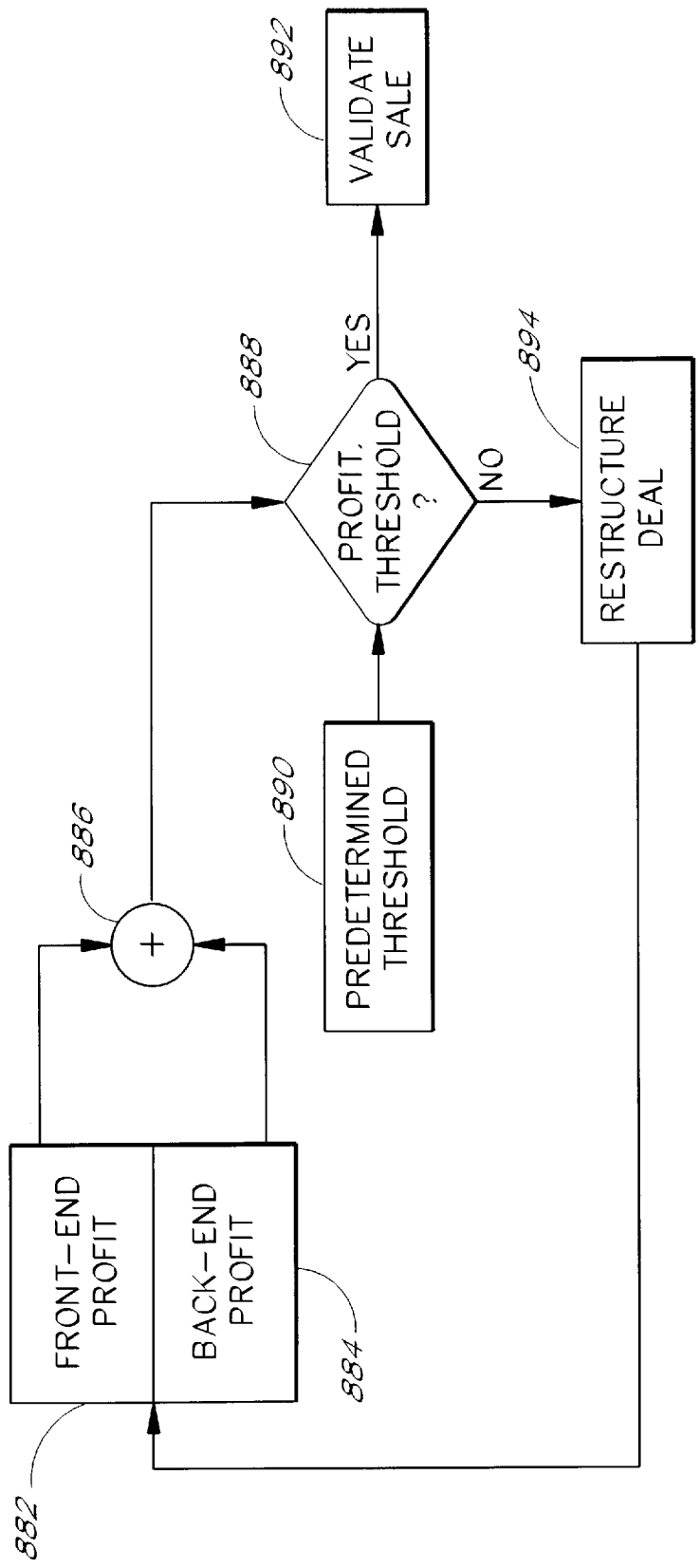
FIG. 14 is an overview diagram of one aspect of the operation of the desk system shown in FIGS. 1 and 2.

Referring to FIG. 14, an overview of validating the sale of an asset will be given. In the sale of an asset wherein multiple departments of a business or multiple people are involved in the sale, there may be a partitioning of several aspects of the sale such that the profits or commissions can be divided according to the departments, people involved, or other factors. As shown in FIG. 14, the profits from the sale of the asset are categorized as a front-end profit 882 and a back-end profit 884. The front-end profit 882 and back-end profit 884 are summed by a summing operation 886. The value of the summed profits are compared to a predetermined threshold 890 set by the seller of the asset at a decision state 888. If the summed profits are greater than the threshold 890, the sale or deal is allowed or validated at state 892. However, if the summed profits are not greater than the threshold 890, the sale is blocked and the deal is further negotiated at state 894 to generate a new set of front-end profits 882 and back-end profits 884. The deal can be restructured at state 894 until the decision state 888 evaluates to be true or until either the buyer or seller terminate negotiations. The negotiations can be resumed at a later time if the current status of the deal is saved.

In the example of a vehicle dealership the front-end profit 882 includes credits such a gross profit, a holdback credit, and a paint protection credit. The back-end profit 884 includes credits such as a reserve credit, a life insurance credit, an accident and health insurance credit, an involuntary unemployment insurance credit, a service contract credit, and a special package credit. Most of these front-end and back-end credits are coded into the profitometer 344 shown in the example first pencil screen of FIG. 5.

The embodiments disclosed herein for the Decision Flex system 100 can be extended to the purchase of other types of expensive assets.

Although the invention has been described with reference to specific embodiments, the description is intended to be illustrative of the invention and is not intended to be limiting. Various modifications and applications may occur to those skilled in the art without departing from the true spirit and scope of the invention as defined in the appended claims.

What is claimed is:

1. In a data processing unit having a memory and capable of executing software code, a method of selecting a seller's best profit financial program from a rank ordered, plurality of financial programs, comprising the steps of:

(1) providing a sales price of an asset;
(2) retrieving credit information unique to a customer from the memory;
(3) retrieving one or more credit questions from the memory;
(4) receiving a credit answer, indicative of the customer, responsive to each of the credit questions;
(5) automatically selecting one of the predetermined rank ordered financial programs based upon the credit information and the credit answers; and
(6) iterating steps (3) through (5) multiple times until a seller's best profit financial program is selected, wherein the selected financial program may be different than a previously selected financial program.

2. The method defined in claim 1, wherein the credit information includes a number communicated from a central database external to said data processing unit.

3. The method defined in claim 1, wherein a selected one said credit question is "More than one bankruptcy?".

4. The method defined in claim 3, wherein the credit answer to the selected one credit question is "No".

5. The method defined in claim 1, wherein the rank ordering of the financial programs depends on a maximum advance percentage and the seller's best profit financial program has the highest profit.

6. The method defined in claim 1, additionally comprising the step of providing budget information about the customer.

7. The method defined in claim 1, wherein the step of retrieving one or more credit questions from the memory is determined, in art by the credit information.

* * * * *